(12) United States Patent
Li et al.

(10) Patent No.: US 11,534,268 B2
(45) Date of Patent: Dec. 27, 2022

(54) ALTERNATIVE BITE ADJUSTMENT STRUCTURES

(71) Applicant: Align Technology, Inc., San Jose, CA (US)

(72) Inventors: Huizhong Li, San Jose, CA (US); Crystal Tjhia, Sunnyvale, CA (US); Eric Yau, Saratoga, CA (US); Rohit Tanugula, San Jose, CA (US); Jun Sato, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 273 days.

(21) Appl. No.: 16/171,159

(22) Filed: Oct. 25, 2018

(65) Prior Publication Data
US 2019/0125494 A1    May 2, 2019

Related U.S. Application Data

(60) Provisional application No. 62/578,134, filed on Oct. 27, 2017.

(51) Int. Cl.
*A61C 7/08* (2006.01)
*A61C 7/00* (2006.01)
*A61C 7/36* (2006.01)

(52) U.S. Cl.
CPC ............... *A61C 7/08* (2013.01); *A61C 7/002* (2013.01); *A61C 7/36* (2013.01)

(58) Field of Classification Search
CPC .. A61C 7/08; A61C 7/002; A61C 7/36; A61C 7/00

USPC ......................................................... 433/6–24
See application file for complete search history.

(56) References Cited

U.S. PATENT DOCUMENTS

| | | | |
|---|---|---|---|
| 2,171,695 | A | 9/1939 | Harper |
| 2,194,790 | A | 3/1940 | Gluck |
| 2,467,432 | A | 4/1949 | Kesling |
| 2,531,222 | A | 11/1950 | Kesling |
| 3,089,487 | A | 5/1963 | Enicks et al. |

(Continued)

FOREIGN PATENT DOCUMENTS

| | | |
|---|---|---|
| AU | 517102 B | 11/1977 |
| AU | 3031677 A | 11/1977 |

(Continued)

OTHER PUBLICATIONS

US 8,553,966 B1, 10/2013, Alpern et al. (withdrawn)

(Continued)

*Primary Examiner* — Ralph A Lewis
*Assistant Examiner* — Mirayda A Aponte
(74) *Attorney, Agent, or Firm* — Shay Glenn LLP

(57) ABSTRACT

A series of appliances including a first appliance and a second appliance. The first appliance can be configured to receive at least one tooth of a first jaw and have a first number of bite adjustment structures extending from the lingual surface of the first appliance. The first number of bite adjustment structures can have a first shape and location specific to a first stage of the treatment plan. The second appliance can be configured to receive at least one tooth of the second jaw, have a second number of bite adjustment structures extending from the second appliance and be designed to make contact with the first number of bite adjustment structures.

11 Claims, 17 Drawing Sheets

(56) References Cited

U.S. PATENT DOCUMENTS

| | | |
|---|---|---|
| 3,092,907 A | 6/1963 | Traiger |
| 3,178,820 A | 4/1965 | Kesling |
| 3,211,143 A | 10/1965 | Grossberg |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,055,895 A | 11/1977 | Huge |
| 4,117,596 A | 10/1978 | Wallshein |
| 4,134,208 A | 1/1979 | Pearlman |
| 4,139,944 A | 2/1979 | Bergersen |
| 4,179,811 A | 12/1979 | Hinz |
| 4,183,141 A | 1/1980 | Dellinger |
| 4,195,046 A | 3/1980 | Kesling |
| 4,253,828 A | 3/1981 | Coles et al. |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,932,866 A | 6/1990 | Guis |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A | 10/1991 | Abbatte et al. |
| 5,061,839 A | 10/1991 | Matsuno et al. |
| 5,083,919 A | 1/1992 | Quach |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |

(56) References Cited

U.S. PATENT DOCUMENTS

| | | |
|---|---|---|
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coll et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,217,334 B1 | 4/2001 | Hultgren |
| 6,227,850 B1 | 5/2001 | Chishti et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiessen et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |

(56) References Cited

U.S. PATENT DOCUMENTS

| | | |
|---|---|---|
| 6,571,227 B1 | 5/2003 | Agrafiotis et al. |
| 6,572,372 B1 | 6/2003 | Phan et al. |
| 6,573,998 B2 | 6/2003 | Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |

(56) References Cited

U.S. PATENT DOCUMENTS

| | | | |
|---|---|---|---|
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,160,334 B2 | 4/2012 | Thiel et al. |
| 8,172,569 B2 | 5/2012 | Matty et al. |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,899,976 B2 | 12/2014 | Chen et al. |
| 8,936,463 B2 | 1/2015 | Mason et al. |
| 8,944,812 B2 | 2/2015 | Kuo |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |
| 9,675,430 B2 | 6/2017 | Verker et al. |
| 9,693,839 B2 | 7/2017 | Atiya et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,706 B2 | 11/2018 | Elbaz et al. |
| 10,123,853 B2 | 11/2018 | Moss et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,248,883 B2 | 4/2019 | Borovinskih et al. |
| 10,258,432 B2 | 4/2019 | Webber |

(56) References Cited

U.S. PATENT DOCUMENTS

| | | |
|---|---|---|
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1* | 11/2003 | Lotte .................. A61C 7/36 433/6 |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0042569 A1 | 2/2005 | Plan et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0231765 A1 | 10/2007 | Phan et al. |
| 2007/0238065 A1 | 10/2007 | Sherwood et al. |
| 2007/0239488 A1 | 10/2007 | DeRosso |

(56) References Cited

U.S. PATENT DOCUMENTS

| | | |
|---|---|---|
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118886 A1 | 5/2008 | Liang et al. |
| 2008/0141534 A1 | 6/2008 | Hilliard |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Beiski et al. |
| 2009/0218514 A1 | 9/2009 | Klunder et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0068676 A1 | 3/2010 | Mason et al. |
| 2010/0086890 A1 | 4/2010 | Kuo |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0045428 A1 | 2/2011 | Boltunov et al. |
| 2011/0056350 A1 | 3/2011 | Gale et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0220623 A1 | 9/2011 | Beutler |
| 2011/0235045 A1 | 9/2011 | Koerner et al. |
| 2011/0269092 A1 | 11/2011 | Kuo et al. |
| 2011/0316994 A1 | 12/2011 | Lemchen |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |

(56) References Cited

U.S. PATENT DOCUMENTS

| | | |
|---|---|---|
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Lowe et al. |
| 2015/0182303 A1 | 7/2015 | Abraham et al. |
| 2015/0216626 A1 | 8/2015 | Ranjbar |
| 2015/0216716 A1 | 8/2015 | Anitua Aldecoa |
| 2015/0230885 A1 | 8/2015 | Wucher |
| 2015/0238280 A1 | 8/2015 | Wu et al. |
| 2015/0238283 A1* | 8/2015 | Tanugula ............ A61C 7/08 433/6 |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1 | 12/2016 | Schulhof et al. |
| 2016/0367339 A1 | 12/2016 | Khardekar et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0049326 A1 | 2/2017 | Alfano et al. |
| 2017/0056131 A1 | 3/2017 | Alauddin et al. |
| 2017/0071705 A1 | 3/2017 | Kuo |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0215739 A1 | 8/2017 | Miyasato |
| 2017/0251954 A1 | 9/2017 | Lotan et al. |
| 2017/0258555 A1 | 9/2017 | Kopelman |
| 2017/0265970 A1 | 9/2017 | Verker |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2017/0340415 A1 | 11/2017 | Choi et al. |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071054 A1 | 3/2018 | Ha |
| 2018/0071055 A1 | 3/2018 | Kuo |
| 2018/0085059 A1 | 3/2018 | Lee |
| 2018/0096465 A1 | 4/2018 | Levin |
| 2018/0125610 A1 | 5/2018 | Carrier et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |
| 2018/0192877 A1 | 7/2018 | Atiya et al. |
| 2018/0280118 A1 | 10/2018 | Cramer |
| 2018/0284727 A1 | 10/2018 | Cramer et al. |
| 2018/0318043 A1 | 11/2018 | Li et al. |
| 2018/0353264 A1 | 12/2018 | Riley et al. |
| 2018/0360567 A1 | 12/2018 | Xue et al. |
| 2018/0368944 A1 | 12/2018 | Sato et al. |
| 2018/0368961 A1 | 12/2018 | Shanjani et al. |
| 2019/0019187 A1 | 1/2019 | Miller et al. |
| 2019/0021817 A1 | 1/2019 | Sato et al. |
| 2019/0026599 A1 | 1/2019 | Salah et al. |
| 2019/0029522 A1 | 1/2019 | Sato et al. |
| 2019/0029784 A1 | 1/2019 | Moalem et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076026 A1 | 3/2019 | Elbaz et al. |
| 2019/0076214 A1 | 3/2019 | Nyukhtikov et al. |
| 2019/0076216 A1 | 3/2019 | Moss et al. |
| 2019/0090983 A1 | 3/2019 | Webber et al. |

FOREIGN PATENT DOCUMENTS

| | | |
|---|---|---|
| CA | 1121955 A1 | 4/1982 |
| CN | 1655732 A | 8/2005 |
| CN | 1655733 A | 8/2005 |
| CN | 102017658 A | 4/2011 |
| CN | 103889364 A | 6/2014 |
| CN | 204092220 U | 1/2015 |
| CN | 105496575 A | 4/2016 |
| CN | 105997274 A | 10/2016 |
| CN | 107088101 A | 8/2017 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| EP | 2848229 A1 | 3/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 04-028359 A | 1/1992 |
| JP | 08-508174 A | 9/1996 |

(56) References Cited

FOREIGN PATENT DOCUMENTS

| | | |
|---|---|---|
| JP | 09-19443 A | 1/1997 |
| JP | 2003245289 A | 9/2003 |
| JP | 2000339468 A | 9/2004 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 10-20020062793 A | 7/2002 |
| KR | 10-20090065778 A | 6/2009 |
| KR | 10-1266966 B1 | 5/2013 |
| KR | 10-2016-041632 A | 4/2016 |
| KR | 10-2016-0071127 A | 6/2016 |
| KR | 10-1675089 B1 | 11/2016 |
| TW | 480166 B | 3/2002 |
| WO | WO91/004713 A1 | 4/1991 |
| WO | WO92/03102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | WO01/08592 A1 | 2/2001 |
| WO | WO01/85047 A2 | 11/2001 |
| WO | WO02/017776 A2 | 3/2002 |
| WO | WO02/062252 A1 | 8/2002 |
| WO | WO02/095475 A1 | 11/2002 |
| WO | WO03/003932 A2 | 1/2003 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |
| WO | WO2009/016645 A2 | 2/2009 |
| WO | WO2009/085752 A2 | 7/2009 |
| WO | WO2009/089129 A1 | 7/2009 |
| WO | WO2009/146788 A1 | 12/2009 |
| WO | WO2009/146789 A1 | 12/2009 |
| WO | WO2010/059988 A1 | 5/2010 |
| WO | WO2010/123892 A2 | 10/2010 |
| WO | WO2012/007003 A1 | 1/2012 |
| WO | WO2012/064684 A2 | 5/2012 |
| WO | WO2012/074304 A2 | 6/2012 |
| WO | WO2012/078980 A2 | 6/2012 |
| WO | WO2012/083968 A1 | 6/2012 |
| WO | WO2012/140021 A2 | 10/2012 |
| WO | WO2013/058879 A2 | 4/2013 |
| WO | WO2014/068107 A1 | 5/2014 |
| WO | WO2014/091865 A1 | 6/2014 |
| WO | WO2015/015289 A2 | 2/2015 |
| WO | WO2015/063032 A1 | 5/2015 |
| WO | WO2015/112638 A1 | 7/2015 |
| WO | WO2015/176004 A1 | 11/2015 |
| WO | WO2016/004415 A1 | 1/2016 |
| WO | WO2016/042393 A1 | 3/2016 |
| WO | WO2016/061279 A1 | 4/2016 |
| WO | WO2016/084066 A1 | 6/2016 |
| WO | WO2016/099471 A1 | 6/2016 |
| WO | WO2016/113745 A1 | 7/2016 |
| WO | WO2016/116874 A1 | 7/2016 |
| WO | WO2016/200177 A1 | 12/2016 |
| WO | WO2017/006176 A1 | 1/2017 |
| WO | WO2018/057547 A1 | 3/2018 |
| WO | WO-2018057547 A1 * | 3/2018 | ............... A61C 7/36 |
| WO | WO2018/085718 A2 | 5/2018 |
| WO | WO2018/232113 A1 | 12/2018 |
| WO | WO2019/018784 A1 | 1/2019 |

OTHER PUBLICATIONS

AADR. American Association for Dental Research; Summary of Activities; Los Angeles, CA; p. 195; March 20-23,(year of pub. sufficiently earlier than effective US filing date and any foreign priority date) 1980.

Alcaniz et al; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.

Alexander et al.; The DigiGraph Work Station Part 2 Clinical Management; J. Clin. Orthod.; pp. 402-407; (Author Manuscript); Jul. 1990.

Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.

Allesee Orthodontic Appliance: Important Tip About Wearing the Red White & Blue Active Clear Retainer System; Allesee Orthodontic Appliances-Pro Lab; 1 page; (year of pub. sufficiently earlier than effective US filing date and any foreign priority date); 1998.

Allesee Orthodontic Appliances: DuraClearTM; Product information; 1 page; (year of pub. sufficiently earlier than effective US filing date and any foreign priority date) 1997.

Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.

Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.

Allesee Orthodontic Appliances; The Choice is Clear: Red, White & Blue . . . The Simple, Affordable, No-Braces Treatment; (Patient Information); retrieved from the internet (http://ormco.com/aoa/appliancesservices/RWB/patients.html); 2 pages on May 19, 2003.

Allesee Orthodontic Appliances; The Red, White & Blue Way to Improve Your Smile; (information for patients), 2 pages; (year of pub. sufficiently earlier than effective US filing date and any foreign priority date) 1992.

Allesee Orthodontic Appliances; You may be a candidate for this invisible no-braces treatment; product information for patients; 2 pages; (year of pub. sufficiently earlier than effective US filing date and any foreign priority date) 2002.

Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.

Altschuler et al.; Laser Electro-Optic System for Rapid Three-Dimensional (3D) Topographic Mapping of Surfaces; Optical Engineering; 20(6); pp. 953-961; Dec. 1981.

Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.

Altschuler; 3D Mapping of Maxillo-Facial Prosthesis; AADR Abstract #607; 2 pages total, (year of pub. sufficiently earlier than effective US filing date and any foreign priority date) 1980.

(56) References Cited

OTHER PUBLICATIONS

Alves et al.; New trends in food allergens detection: toward biosensing strategies; Critical Reviews in Food Science and Nutrition; 56(14); pp. 2304-2319; doi: 10.1080/10408398.2013.831026; Oct. 2016.

Andersson et al.; Clinical Results with Titanium Crowns Fabricated with Machine Duplication and Spark Erosion; Acta Odontologica Scandinavica; 47(5); pp. 279-286; Oct. 1989.

Andrews, The Six Keys to Optimal Occlusion Straight Wire, Chapter 3, L.A. Wells; pp. 13-24; (year of pub. sufficiently earlier than effective US filing date and any foreign priority date) 1989.

Arakawa et al; Mouthguard biosensor with telemetry system for monitoring of saliva glucose: A novel cavitas sensor; Biosensors and Bioelectronics; 84; pp. 106-111; Oct. 2016.

Bandodkar et al.; All-printed magnetically self-healing electrochemical devices; Science Advances; 2(11); 11 pages; e1601465; Nov. 2016.

Bandodkar et al.; Self-healing inks for autonomous repair of printable electrochemical devices; Advanced Electronic Materials; 1(12); 5 pages; 1500289; Dec. 2015.

Bandodkar et al.; Wearable biofuel cells: a review; Electroanalysis; 28(6); pp. 1188-1200; Jun. 2016.

Bandodkar et al.; Wearable chemical sensors: present challenges and future prospects; Acs Sensors; 1(5); pp. 464-482; May 11, 2016.

Barone et al.; Creation of 3D multi-body orthodontic models by using independent imaging sensors; Sensors; 13(2); pp. 2033-2050; Feb. 5, 2013.

Bartels et al.; An Introduction to Splines for Use in Computer Graphics and Geometric Modeling; Morgan Kaufmann Publishers; pp. 422-425 Jan. 1, 1987.

Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.

Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.

Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.

Baumrind; Integrated Three-Dimensional Craniofacial Mapping: Background, Principles, and Perspectives; Seminars in Orthodontics; 7(4); pp. 223-232; Dec. 2001.

Begole et al.; A Computer System for the Analysis of Dental Casts; The Angle Orthodontist; 51(3); pp. 252-258; Jul. 1981.

Bernard et al; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.

Bhatia et al.; A Computer-Aided Design for Orthognathic Surgery; British Journal of Oral and Maxillofacial Surgery; 22(4); pp. 237-253; Aug. 1, 1984.

Biggerstaff et al.; Computerized Analysis of Occlusion in the Postcanine Dentition; American Journal of Orthodontics; 61(3); pp. 245-254; Mar. 1972.

Biggerstaff; Computerized Diagnostic Setups and Simulations; Angle Orthodontist; 40(I); pp. 28-36; Jan. 1970.

Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.

Blu et al.; Linear interpolation revitalized; IEEE Transactions on Image Processing; 13(5); pp. 710-719; May 2004.

Bourke, Coordinate System Transformation; 1 page; retrived from the internet (http://astronomy.swin.edu.au/pbourke/prolection/coords) on Nov. 5, 2004; Jun. 1996.

Boyd et al.; Three Dimensional Diagnosis and Orthodontic Treatment of Complex Malocclusions With the Invisalipn Appliance; Seminars in Orthodontics; 7(4); pp. 274-293; Dec. 2001.

Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.

Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.

Burstone et al.; Precision Adjustment of the Transpalatal Lingual Arch: Computer Arch Form Predetermination; American Journal of Orthodontics; 79(2);pp. 115-133; Feb. 1981.

Burstone; Dr. Charles J. Burstone on The Uses of the Computer in Orthodontic Practice (Part 1); Journal of Clinical Orthodontics; 13(7); pp. 442-453; (interview); Jul. 1979.

Burstone; Dr. Charles J. Burstone on The Uses of the Computer in Orthodontic Practice (Part 2); journal of Clinical Orthodontics; 13(8); pp. 539-551 (interview); Aug. 1979.

Cardinal Industrial Finishes; Powder Coatings; 6 pages; retrieved from the internet (http://www.cardinalpaint.com) on Aug. 25, 2000.

Carnaghan, An Alternative to Holograms for the Portrayal of Human Teeth; 4th Int'l. Conf. on Holographic Systems, Components and Applications; pp. 228-231; Sep. 15, 1993.

Chaconas et al,; The DigiGraph Work Station, Part 1, Basic Concepts; Journal of Clinical Orthodontics; 24(6); pp. 360-367; (Author Manuscript); Jun. 1990.

Chafetz et al.; Subsidence of the Femoral Prosthesis, A Stereophotogrammetric Evaluation; Clinical Orthopaedics and Related Research; No. 201; pp. 60-67; Dec. 1985.

Chiappone; Constructing the Gnathologic Setup and Positioner; Journal of Clinical Orthodontics; 14(2); pp. 121-133; Feb. 1980.

Chishti et al.; U.S. Appl. No. 60/050,342 entitled "Procedure for moving teeth using a seires of retainers," filed Jun. 20, 1997.

CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.

Cottingham; Gnathologic Clear Plastic Positioner; American Journal of Orthodontics; 55(1); pp. 23-31; Jan. 1969.

Crawford; CAD/CAM in the Dental Office: Does It Work?; Canadian Dental Journal; 57(2); pp. 121-123 Feb. 1991.

Crawford; Computers in Dentistry: Part 1: CAD/CAM: The Computer Moves Chairside, Part 2: F. Duret A Man With A Vision, Part 3: The Computer Gives New Vision—Literally, Part 4: Bytes 'N Bites The Computer Moves From The Front Desk To The Operatory; Canadian Dental Journal; 54(9); pp. 661-666 Sep. 1988.

Crooks; CAD/CAM Comes to USC; USC Dentistry; pp. 14-17; (year of pub. sufficiently earlier than effective US filing date and any foreign priority date) Spring 1990.

Cureton; Correcting Malaligned Mandibular Incisors with Removable Retainers; Journal of Clinical Orthodontics; 30(7); pp. 390-395; Jul. 1996.

Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.

Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.

DCS Dental AG; The CAD/CAM 'DCS Titan System' for Production of Crowns/Bridges; DSC Production; pp. 1-7; Jan. 1992.

Defranco et al.; Three-Dimensional Large Displacement Analysis of Orthodontic Appliances; Journal of Biomechanics; 9(12); pp. 793-801; Jan. 1976.

Dental Institute University of Zurich Switzerland; Program for International Symposium on Computer Restorations: State of the Art of the CEREC-Method; 2 pages; May 1991.

Dentrac Corporation; Dentrac document; pp. 4-13; (year of pub. sufficiently earlier than effective US filing date and any foreign priority date) 1992.

(56) References Cited

OTHER PUBLICATIONS

Dent-x; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Muzio et al.; Minimum intensity projection (MinIP); 6 pages; retrieved from the internet (https://radiopaedia.org/articles/minimum-intensity-projection-minip) on Sep. 6, 2018.
Doruk et al.; The role of the headgear timer in extraoral co-operation; European Journal of Orthodontics; 26; pp. 289-291; Jun. 1, 2004.
Doyle; Digital Dentistry; Computer Graphics World; pp. 50-52 andp. 54; Oct. 2000.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Duret et al.; CAD/CAM Imaging in Dentistry; Current Opinion in Dentistry; 1 (2); pp. 150-154; Apr. 1991.
Duret et al; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio:10.1100/2012/647240; 7 pages; Jul. 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Farooq et al.; Relationship between tooth dimensions and malocclusion; JPMA: The Journal of the Pakistan Medical Association; 64(6); pp. 670-674; Jun. 2014.
Felton et al.; A Computerized Analysis of the Shape and Stability of Mandibular Arch Form; American Journal of Orthodontics and Dentofacial Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143 (1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.
Friedrich et al; Measuring system for in vivo recording of force systems in orthodontic treatment-concept and analysis of accuracy; J. Biomech.; 32(1); pp. 81-85; (Abstract Only) Jan. 1999.
Futterling et al.; Automated Finite Element Modeling of a Human Mandible with Dental Implants; JS WSCG '98—Conference Program; 8 pages; retrieved from the Internet (https://dspace5.zcu.ez/bitstream/11025/15851/1/Strasser_98.pdf); on Aug. 21, 2018.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Gim-Alldent Deutschland, "Das DUX System: Die Technik," 3 pages; (English Translation Included); (year of pub. sufficiently earlier than effective US filing date and any foreign priority date); 2002.
Gottlieb et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Grest, Daniel; Marker-Free Human Motion Capture in Dynamic Cluttered Environments from a Single View-Point, PhD Thesis; 171 pages; Dec. 2007.
Guess et al.; Computer Treatment Estimates In Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.eom/t/toolingampproduction/november011996/simulatingstressp utonfa . . . ); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
Imani et al.; A wearable chemical-electrophysiological hybrid biosensing system for real-time health and fitness monitoring; Nature Communications; 7; 11650. doi 1038/ncomms11650; 7 pages; May 23, 2016.
Invisalign; You were made to move. There's never been a better time to straighten your teeth with the most advanced clear aligner in the world; Product webpage; 2 pages; retrieved from the internet (www.invisalign.com/) on Dec. 28, 2017.
Jia et al.; Epidermal biofuel cells: energy harvesting from human perspiration; Angewandle Chemie International Edition; 52(28); pp. 7233-7236; Jul. 8, 2013.
Jia et al.; Wearable textile biofuel cells for powering electronics; Journal of Materials Chemistry A; 2(43); pp. 18184-18189; Oct. 14, 2014.
JCO Interviews; Craig Andreiko , DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jeerapan et al.; Stretchable biofuel cells as wearable textile-based self-powered sensors; Journal of Materials Chemistry A; 4(47); pp. 18342-18353; Dec. 21, 2016.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jones et al.; An Assessment of the Fit of a Parabolic Curve to Pre- and Post-Treatment Dental Arches; British Journal of Orthodontics; 16(2); pp. 85-93; May 1989.
Kamada et.al.; Case Reports On Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.

(56) References Cited

OTHER PUBLICATIONS

Kanazawa et al.; Three-Dimensional Measurements of the Occlusal Surfaces of Upper Molars in a Dutch Population; Journal of Dental Research; 63(11); pp. 1298-1301; Nov. 1984.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kim et al.; Advanced materials for printed wearable electrochemical devices: A review; Advanced Electronic Materials; 3(1); 15 pages; 1600260; Jan. 2017.
Kim et al.; Noninvasive alcohol monitoring using a wearable tatto-based iontophoretic-biosensing system; Acs Sensors; 1(8); pp. 1011-1019; Jul. 22, 2016.
Kim et al.; Non-invasive mouthguard biosensor for continuous salivary monitoring of metabolites; Analyst; 139(7); pp. 1632-1636; Apr. 7, 2014.
Kim et al.; A wearable fingernail chemical sensing platform: pH sensing at your fingertips; Talanta; 150; pp. 622-628; Apr. 2016.
Kim et al.; Wearable salivary uric acid mouthguard biosensor with integrated wireless electronics; Biosensors and Bioelectronics; 74; pp. 1061-1068; 19 pages; (Author Manuscript); Dec. 2015.
Kleeman et al.; The Speed Positioner; J. Clin. Orthod.; 30(12); pp. 673-680; Dec. 1996.
Kochanek; Interpolating Splines with Local Tension, Continuity and Bias Control; Computer Graphics; 18(3); pp. 33-41; Jan. 1, 1984.
Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.
Kumar et al.; Biomarkers in orthodontic tooth movement; Journal of Pharmacy Bioallied Sciences; 7(Suppl 2); pp. S325-S330; 12 pages; (Author Manuscript); Aug. 2015.
Kumar et al.; Rapid maxillary expansion: A unique treatment modality in dentistry; J. Clin. Diagn. Res.; 5(4); pp. 906-911; Aug. 2011.
Kunii et al.; Articulation Simulation for an Intelligent Dental Care System; Displays; 15(3); pp. 181-188; Jul. 1994.
Kuroda et al.; Three-Dimensional Dental Cast Analyzing System Using Laser Scanning; American Journal of Orthodontics and Dentofacial Orthopedics; 110(4); pp. 365-369; Oct. 1996.
Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.
Leinfelder et al.; A New Method for Generating Ceramic Restorations: a CAD-CAM System; Journal of the American Dental Association; 118(6); pp. 703-707; Jun. 1989.
Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.
McCann; Inside the Ada; J. Amer. Dent. Assoc, 118:286-294; Mar. 1989.
McNamara et al.; Invisible Retainers; J. Clin Orthod.; pp. 570-578; 11 pages; (Author Manuscript); Aug. 1985.
McNamara et al.; Orthodontic and Orthopedic Treatment in the Mixed Dentition; Needham Press; pp. 347-353; Jan. 1993.
Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.
Moles; Correcting Mild Malalignments—As Easy As One, Two, Three; AOA/Pro Corner; 11(2); 2 pages; (year of pub. sufficiently earlier than effective US filing date and any foreign priority date) 2002.
Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.
Nahoum; The Vacuum Formed Dental Contour Appliance; N. Y. State Dent. J.; 30(9); pp. 385-390; Nov. 1964.
Nash; CEREC CAD/CAM Inlays: Aesthetics and Durability in a Single Appointment; Dentistry Today; 9(8); pp. 20, 22-23 and 54; Oct. 1990.
Nedelcu et al.; "Scanning Accuracy And Precision In 4 Intraoral Scanners: An In Vitro Comparison Based On 3-Dimensional Analysis"; J. Prosthet. Dent.; 112(6); pp. 1461-1471; Dec. 2014.
Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.
Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
ormco.com; Increasing clinical performance with 3D interactive treatment planning and patient-specific appliances; 8 pages; retrieved from the internet (http://www.konsident.com/wp-content/files_mf/1295385693http___ormco.com_index_cmsfilesystemaction_fileOrmcoPDF_whitepapers.pdf) on Feb. 27, 2019.
Parrilla et al.; A textile-based stretchable multi-ion potentiometric sensor; Advanced Healthcare Materials; 5(9); pp. 996-1001; May 2016.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages, Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.

(56) References Cited

OTHER PUBLICATIONS

Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of the PAR Index (Peer Assessment Rating); Reliability and Validity.; The European Journal of Orthodontics; 14(2); pp. 125-139; Apr. 1992.
Richmond et al.; The Development of a 3D Cast Analysis System; British Journal of Orthodontics; 13(1); pp. 53-54; Jan. 1986.
Richmond; Recording The Dental Cast In Three Dimensions; American Journal of Orthodontics and Dentofacial Orthopedics; 92(3); pp. 199-206; Sep. 1987.
Rudge; Dental Arch Analysis: Arch Form, A Review of the Literature; The European Journal of Orthodontics; 3(4); pp. 279-284; Jan. 1981.
Sahm et al.; "Micro-Electronic Monitoring Of Functional Appliance Wear"; Eur J Orthod.; 12(3); pp. 297-301; Aug. 1990.
Sahm; Presentation of a wear timer for the clarification of scientific questions in orthodontic orthopedics; Fortschritte der Kieferorthopadie; 51 (4); pp. 243-247; (Translation Included) Jul. 1990.
Sakuda et al.; Integrated Information-Processing System In Clinical Orthodontics: An Approach with Use of a Computer Network System; American Journal of Orthodontics and Dentofacial Orthopedics; 101(3); pp. 210-220; 20 pages; (Author Manuscript) Mar. 1992.
Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.
Schellhas et al.; Three-Dimensional Computed Tomography in Maxillofacial Surgical Planning; Archives of Otolaryngology—Head and Neck Surgery; 114(4); pp. 438-442; Apr. 1988.
Schroeder et al; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens; Cerec—Computer-Reconstruction, High Tech in derZahnmedizin; 15 pagesl; (Includes Machine Translation); (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Sirona Dental Systems GmbH, Cerec 3D, Manuel utiiisateur, Version 2.0X (in French); 114 pages; (English translation of table of contents included); (year of pub. sufficiently earlier than effective US filing date and any foreign priority date); 2003.
Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.

The American Heritage, Stedman's Medical Dictionary; Gingiva; 3 pages; retrieved from the interent (http://reference.com/search/search?q=gingiva) on Nov. 5, 2004.
The Dental Company Sirona: Cere omnicam and cerec bluecam brochure: The first choice in every case; 8 pages; (year of pub. sufficiently earlier than effective US filing date and any foreign priority date) 2014.
Thera Mon; "Microsensor"; 2 pages; retrieved from the internet (www.english.thera-mon.com/the-product/transponder/index.html); on Sep. 19, 2016.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-8; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.
Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.
Van Der Linden et al.; Three-Dimensional Analysis of Dental Casts by Means of the Optocom; Journal of Dental Research; 51(4); p. 1100; Jul.-Aug. 1972.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering Of Geometric Models' An Introduction; Computer-Aided Design; 29(4); pp. 255-268; 20 pages; (Author Manuscript); Apr. 1997.
Verstreken et al.; An Image-Guided Planning System for Endosseous Oral Implants; IEEE Transactions on Medical Imaging; 17(5); pp. 842-852; Oct. 1998.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23(10); pp. 694-700; Oct. 1989.
Watson et al.; Pressures recorded at te denture base-mucosal surface interface in complete denture wearers; Journal of Oral Rehabilitation 14(6); pp. 575-589; Nov. 1987.
Wells; Application of the Positioner Appliance in Orthodontic Treatment; American Journal of Orthodontics; 58(4); pp. 351-366; Oct. 1970.
Wikipedia; Palatal expansion; 3 pages; retrieved from the internet (https://en.wikipedia.org/wiki/Palatal_expansion) on Mar. 5, 2018.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Windmiller et al.; Wearable electrochemical sensors and biosensors: a review; Electroanalysis; 25(1); pp. 29-46; Jan. 2013.

(56) References Cited

OTHER PUBLICATIONS

Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.
Wolf; Three-dimensional structure determination of semi-transparent objects from holographic data; Optics Communications; 1(4); pp. 153-156; Sep. 1969.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamada et al.; Simulation of fan-beam type optical computed-tomography imaging of strongly scattering and weakly absorbing media; Applied Optics; 32(25); pp. 4808-4814; Sep. 1, 1993.
Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998,.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Zhou et al.; Bio-logic analysis of injury biomarker patterns in human serum samples; Taianta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Grove et al.; U.S. Appl. No. 15/726,243 entitled "Interproximal reduction templates," filed Oct. 5, 2017.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.; U.S. Appl. No. 16/198,488 entitled "Intraoral scanner with dental diagnostics capabilities," filed Nov. 21, 2018.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners." Dec. 24, 2018.
Kopleman et al., U.S. Appl. No. 16/220,381 entitled "Closed loop adaptive orthodontic treatment methods and apparatuses," Dec. 14, 2018.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/OBB/OBBT.html); relieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.

(56) References Cited

OTHER PUBLICATIONS

Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide; journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Szeliski; Introduction to computer vision: Structure from motion; 64 pages; retrieved from the internet (http://robots.Stanford.edu/cs223b05/notes/CS%20223-B%20L10%structurefrommotion1b.ppt, on Feb. 3, 2005.
Vevin et al.; Pose estimation of teeth through crown-shape matching; In Medical Imaging: Image Processing of International Society of Optics and Photonics; vol. 4684; pp. 955-965; May 9, 2002.
Video of DICOM to Surgical Guides; [Copy Not Enclosed], Can be viewed at <URL:https://youtu.be/47KtOmCEFQk; Published Apr. 4, 2016.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wiedmann; According to the laws of harmony to find the right tooth shape with assistance of the computer; Digital Dental News; 2nd vol.; pp. 0005-0008; (English Version Included); Apr. 2008.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.
Bernabe et al.; Are the lower incisors the best predictors for the unerupted canine and premolars sums? An analysis of Peruvian sample; The Angle Orthodontist; 75(2); pp. 202-207; Mar. 2005.
Collins English Dictionary; Teeth (definition); 9 pages; retrieved from the internet (https:www.collinsdictionary.com/us/dictionary/english/teeth) on May 13, 2019.
dictionary.com; Plural (definition); 6 pages; retrieved from the internet ( https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Martinelli et al.; Prediction of lower permanent canine and premolars width by correlation methods; The Angle Orthodontist; 75(5); pp. 805-808; Sep. 2005.
Nourallah et al.; New regression equations for prediciting the size of unerupted canines and premolars in a contemporary population; The Angle Orthodontist; 72(3); pp. 216-221; Jun. 2002.
Paredes et al.; A new, accurate and fast digital method to predict unerupted tooth size; The Angle Orthodontist; 76(1); pp. 14-19; Jan. 2006.

\* cited by examiner

ALTERNATIVE BITE ADJUSTMENT STRUCTURES

TECHNICAL FIELD

The present disclosure is related generally to the field of dental treatment. More particularly, the present disclosure is related to systems, methods, computing device readable media, and devices for providing alternative bite adjustment structures.

BACKGROUND

In some dental treatment cases, a patient may have a malocclusion, where the patient's teeth do not line up properly. One example of a malocclusion is a deep bite, which is an acute case of an overbite where the patient's lower teeth are overlapped by the upper teeth and the lower incisors may come into contact with the gingival tissue in the upper arch of the jaw. A deep bite can be an aesthetic problem and/or a problem with health consequences such as damage to the roots of the upper teeth, damage to the gingival tissue in the upper arch of the jaw, and/or wearing of the bottom teeth from frictional contact with the upper teeth, among others.

Some previous approaches to correcting a deep bite condition in a patient may have included intrusion of the anterior (e.g., incisors and/or canines) teeth and/or extrusion of the posterior teeth (e.g., premolars and/or molars). Extrusion of the posterior teeth may be facilitated by the use of bite turbos (e.g., metal blocks adhered to a back (lingual) surface of the upper anterior teeth to reduce contact between posterior teeth in an opposing jaw and allow for more eruption), anterior bite plates contacting the anterior dentition while allowing posterior eruption (e.g., in non-adult patients)). However, extrusion of posterior teeth in adult patients may lead to unstable results. Intrusion of the anterior teeth may be facilitated by anchor bend (e.g., metal anchors on the molars that are used to apply an upward force to the incisors), J-hook headgear, expansion screws, or bypass archwires that bypass premolars and/or canines to maintain reduced forces by lengthening the span between molars and incisors. Another previous approach to correcting a deep bite condition in a patient may be orthognathic surgical correction in which the jaw is surgically modified to reduce or correct the malocclusion.

These methods may be effective, but they may have to be accomplished before alignment of the teeth of the jaw can be initiated and/or cause the patient to recover from surgery prior to beginning treatment for occlusion. Additionally, in some situations, crooked or tipped teeth may not allow these types of devices to be utilized or may render them ineffective.

DETAILED DESCRIPTION

Figure 1:
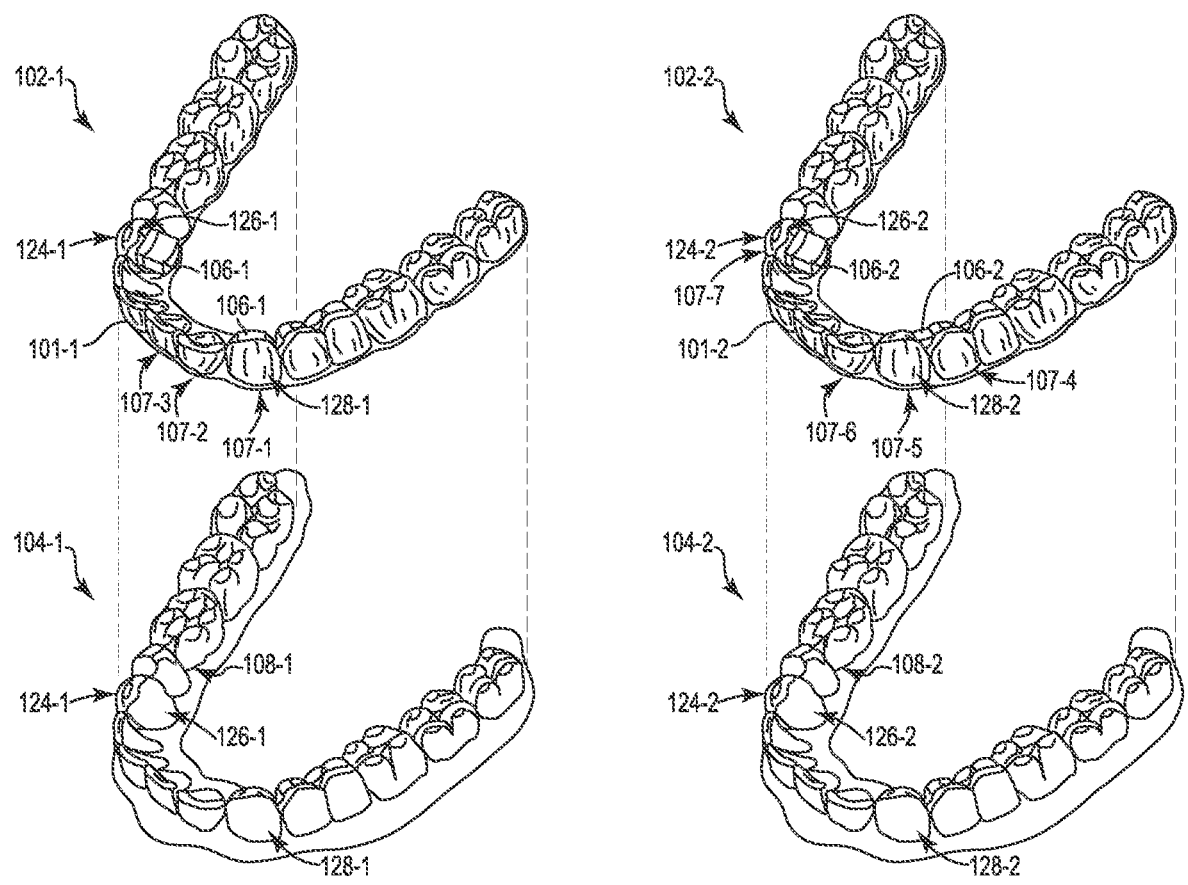
FIG. 1 illustrates a perspective view of a first dental position adjustment appliance and a second dental position adjustment appliance according to a number of embodiments of the present disclosure.

Dental Appliances Having Alternative Bite Adjustment Structures

In contrast to some previous approaches the embodiments of the present disclosure address conditions such as deep bite by encouraging the jaws into an alternative bite configuration through use of one or more alternative bite structures. Methods, systems, and devices utilizing computer readable media to design and determine the positioning of such structure are also disclosed herein.

An example of a device embodiment utilizing an alternative bite adjustment structure includes a dental positioning appliance (e.g., aligner) including a number of bite adjustment structures positioned on one or more teeth other than the traditional incisor. For example, as described herein, the bite adjustment structures can be placed on teeth based on a number of factors that indicate that traditional positioning of a structure would be ineffective (e.g., the incisors are crooked or tipped with respect to the teeth of the opposing jaw, the distance between the proposed position of the bite adjustment structure and the teeth of the opposing jaw is too great, etc.).

Additionally, the dental positioning appliance can, in addition to providing bite adjustment functionality, be utilized to incrementally implement a treatment plan for movement of other teeth on the jaws of the patient.

In the dental industry, dental treatments may involve, for instance, restorative and/or orthodontic procedures. Restorative procedures may be designed to implant a dental prosthesis (e.g., a crown, bridge inlay, onlay, veneer, etc.) intraorally in a patient. Orthodontic procedures may include repositioning misaligned teeth and changing bite configurations for improved cosmetic appearance and/or dental function. Orthodontic repositioning can be accomplished, for example, by applying controlled forces to one or more teeth over a period of time.

As an example, orthodontic repositioning may be provided through a dental process that uses positioning appliances for realigning teeth. Such appliances may utilize a thin shell of material having resilient properties, referred to as an "aligner," that generally conforms to a user's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through one or more intermediate arrangements to a final and/or desired arrangement.

Such systems may utilize materials that are lightweight and/or transparent to provide as a set of appliances that can be used serially such that, as the teeth move, a new appliance can be implemented to further move the teeth.

One, several, or all of a series of appliances used for the movement of other teeth on the jaws of the patient can include bite adjustment structures that are positioned (e.g., with a shape and location) that is specific to a respective stage of a treatment plan associated with each appliance. In some embodiments, the bite adjustment structures can be formed of the same material as the appliance and/or formed at the same time as the appliance.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure. Also, as used herein, "a number of" a particular thing can refer to one or more of such things (e.g., a number of bite adjustment structures can refer to one or more bite adjustment structures).

FIG. 1 illustrates a perspective view of a first dental position adjustment appliance 102-1 and second dental position adjustment appliance 102-2 according to a number of embodiments of the present disclosure. Appliances according to the present disclosure can include, in some embodiments, a plurality of incremental dental position adjustment appliances. The appliances, such as appliance 102-1 and appliance 102-2 illustrated in FIG. 1, can be utilized to incrementally implement a treatment plan for the movement of teeth with respect to each other on the jaws of the patient such as by affecting incremental repositioning of individual teeth in the jaw, among other suitable uses. Appliances, such as appliance 102-1 and appliance 102-2, can be fabricated according to a virtual dental model that has had positions of a number of teeth adjusted according to one or more embodiments of the present disclosure.

Appliances can include any positioners, retainers, and/or other removable appliances for finishing and maintaining teeth positioning in connection with a dental treatment. These appliances may be utilized by the treatment professional in performing a treatment plan. For example, a treatment plan can include the use of a set of appliances, created according to models described herein.

An appliance (e.g., appliance 102-1 and appliance 102-2 in FIG. 1) can, for example, be fabricated from a polymeric shell, and/or formed from other material, having a plurality of cavities therein (e.g., cavity 107-1, cavity 107-2, cavity 107-3, 107-4, 107-5, 107-6, 107-7 generally referred to herein as cavities 107). The cavities 107 can be designed (e.g., shaped) to receive one or more teeth 104 and/or apply force to reposition one or more teeth 104 of a jaw from one teeth arrangement to a successive teeth arrangement. The shell may be designed to fit over a number of, or in many instances all, teeth 104 present in the upper and/or lower jaw.

The appliance 102-1 can include a first number of bite adjustment structures 106-1 formed as part of a first shell, extending from the lingual surface 126-1 of at least one of the plurality of cavities 107. The first number of bite adjustment structures 106-1 can be formed of the same material as the shell. In some embodiments, the first bite adjustment structures 106-1 can be formed of the same material as the shell as a continuous body.

The first bite adjustment structures 106-1 can be formed at the same time as the shell (e.g., from the same bulk material), such as during a vacuum forming process, where the material is vacuum formed over a model of teeth that is formed based on data representing a user's teeth to form the shell. In such an embodiment, the model will include a shape that corresponds to the first bite adjustment structure such that when the vacuum forming process takes place, the first bite adjustment structure is formed in a surface of one or more of the cavities of the shell that are also formed by the vacuum forming process.

As discussed above, the first shell can include cavities 107 (e.g., where each cavity 107 corresponds to a tooth). The first number of bite adjustment structures 106-1 can be a part of a cavity 107.

A cavity, such as cavity 107-3, that does not include a bite adjustment structure 106-1 can be shaped to mate with a particular tooth. For example, cavity 107-3 can be shaped to mate with three surfaces of a corresponding tooth to be received therein.

The three surfaces, in this example, can be a front (facial) surface 128-1, a back (lingual) surface 126-1, and a biting (incisal) surface 124-1. The cavity 107-3 may be slightly out of alignment with a current configuration of the particular tooth (e.g., to facilitate aligning the particular tooth to a desired position and orientation configuration with respect to the other teeth of the patient), but the cavity 107-3 can generally conform to the shape of the particular tooth such that there is little to no space between the cavity 107-3 and the particular tooth when the first appliance 102-1 is worn.

In contrast, a cavity, such as cavity 107-1, that includes a bite adjustment structure 106-1 can be shaped to mate with two surfaces of a particular tooth. For an incisor or canine, the two surfaces can be a front (facial) surface 128-1 and a biting (incisal) surface 124-1. The back surface (lingual) surface 126-1 of the cavity 107-1 can include the bite adjustment structure 106-1 extending therefrom.

In some embodiments, the front surface (facial) surface 128-1 of the cavity 107-1 can include the bite adjustment structure 106-1 extending therefrom. In some implementations, the bite adjustment structure 106-1 can form a part of the cavity 107 such that when worn over a particular tooth, space exists between the tooth and the inner surface of the bite adjustment structure 106-1. In some embodiments, the space between the tooth and the inner surface of the bite adjustment structure 106-1 can be filled with composite to provide reinforcement and to avoid the damage to a shell. The space between the tooth and the inner surface of the bite adjustment structure 106-1 can be filled with a vinylpoly siloxane (VPS) material.

In some embodiments, the first number of bite adjustment structures 106-1 can extend from the appliance 102-1 toward the back of the mouth (in a facial-lingual direction) and can be designed to make contact with a second number of bite adjustment structures 106-2 formed on a second appliance 102-2 designed to receive teeth of the jaw opposing the jaw over which the appliance 102-1 is intended to be worn. For example, the appliance 102-1 can be designed to fit over teeth 104-1 in a user's upper jaw and the first number of bite adjustment structures 106-1 can be designed to make contact with the second number of bite adjustment structures 106-2 formed on the second appliance 102-2 designed to receive teeth 104-2 of the user's lower jaw.

In some embodiments, the first number of bite adjustment structures 106-1 can extend from a number of cavities 107 of the first shell that receive incisors, canines, premolars, molars, and/or any combination thereof. The first bite adjustment structures 106-1 can extend from the appliance 102-1 toward the back of the mouth and can be designed to make contact with a bite adjustment structure 106-2 affixed to one or more teeth of the jaw opposing the jaw over which the first appliance 102-1 is intended to be worn. In this manner, the first number of bite adjustment structures 106-1 can be designed to make contact with a corresponding tooth or a bite adjustment structure 106-2 on a corresponding tooth on an opposing jaw to provide a disocclusion between the first jaw and the second jaw.

The shape (e.g., size and/or contours, angle(s), etc.) and location (e.g., position on the cavity) of each of the first number of bite adjustment structures 106-1 can be based on one or more factors that indicate ineffective positioning. A particular bite adjustment structure 106-1 can have a shape and location specific to a particular stage of the treatment plan based, for example, on at least one of a contact between a particular first bite adjustment structure 106-1 and a particular second bite adjustment structure 106-2, a contact between particular first bite adjustment structure 106-1 and a particular tooth of an opposing jaw, a number of forces used to reposition a number of teeth of the first and second jaw, and/or an orientation of a tooth over which the bite adjustment structure 106-1 is positioned.

Additionally, the shape (e.g., size and/or contours, angle(s), etc.) and location (e.g., position on the cavity) of each of the first number of bite adjustment structures 106-1 can be specific to a stage of a treatment plan for which the appliance 102-1 was designed. For example, successive appliances created according to a treatment plan may have differently shaped and/or located first number of bite adjustment structures 106-1. The first number of bite adjustment structures 106-1 that have shapes and locations specific to particular stages of treatment can be advantageous over some previous approaches that use generic and/or uniform bite adjustment structures that are not specific to treatment stages and, therefore, may not accurately provide the desired correction for the treatment stage during which they are used. Such inaccurate treatment can lead to lengthening treatment plans, a need for a revised treatment plan, and/or unnecessary user discomfort, among other drawbacks. In contrast a number of embodiments of the present disclosure allow for more timely, accurate, and/or comfortable execution of treatment plans.

In some embodiments, an edge 101-1 of a cavity 107 opposite the biting (incisal) surface 124-1 of the cavity 107 can be shaped to extend beyond a gingival line 108-1 of the user. Extending portions of the shell over the gingival line 108-1 of the jaw can help to distribute a counterforce (e.g., counter to a number of forces applied to the bite adjustment structures 106-1) to other portions of the jaw.

The appliance 102-2 can include a second number of bite adjustment structures 106-2 formed as part of a second shell, extending from at least one of the plurality of cavities and designed to make contact with the first number of bite adjustment structures 106-1. The second number of bite adjustment structures 106-2 can be formed of the same material as the second shell. In some embodiments, the second bite adjustment structures 106-2 can be formed of the same material as the second shell as a continuous body.

The second number of bite adjustment structures 106-2 can be formed at the same time as the second shell (e.g., from the same bulk material), such as during a vacuum forming process, where the material is vacuum formed over a model of teeth that is formed based on data representing a user's teeth to form the shell. In such an embodiment, as with the appliance used on the upper jaw discussed above, the model will include a shape that corresponds to the first bite adjustment structure such that when the vacuum forming process takes place, the first bite adjustment structure is formed in a surface of one or more of the cavities of the shell that are also formed by the vacuum forming process.

Also, as discussed above, the second shell can include cavities 107 (e.g., where each cavity 107 corresponds to a tooth). The second number of bite adjustment structures 106-2 can be a part of a cavity 107.

A cavity, such as cavity 107-5, that does not include a bite adjustment structure 106-2 can be shaped to mate with a particular tooth. For example, cavity 107-5 can be shaped to mate with three surfaces of a corresponding tooth to be received therein.

The three surfaces, in this example, can be a front (facial) surface 128, a back (lingual) surface 126, and a biting (incisal) surface 124. The cavity 107-5 may be slightly out of alignment with a current configuration of the particular tooth (e.g., to facilitate aligning the particular tooth to a desired position and orientation configuration with respect to the other teeth of the patient), but the cavity 107-5 can generally conform to the shape of the particular tooth such that there is little to no space between the cavity 107-5 and the particular tooth when the second appliance 102-2 is worn.

In contrast, a cavity 107, such as cavity 107-4, that includes a bite adjustment structure 106-2, can be shaped to mate with two surfaces of a particular tooth. In some embodiments, for an incisor or canine, the two surfaces can be a front (facial) surface 128 and a biting (incisal) surface 124. The back (lingual) surface 126 of the cavity 107-1 can include the bite adjustment structure 106-2 extending therefrom. In some embodiments, for an incisor or canine, the two surfaces can be a back surface (lingual) surface 126 and a biting (incisal) surface 124. The front (facial) surface 128 of the cavity 107 can include the bite adjustment structure 106-2 extending therefrom.

As discussed above, the bite adjustment structure 106-2 can form a part of the cavity 107 such that when worn over a particular tooth, space exists between the tooth and the inner surface of the bite adjustment structure 106-2. In some embodiments, the space between the tooth and the inner surface of the bite adjustment structure 106-2 can be filled with composite to provide reinforcement and to avoid the damage to the shell. The space between the tooth and the inner surface of the bite adjustment structure 106-2 can be filled with a vinylpoly siloxane (VPS) material.

In some embodiments, a cavity, such as cavity 107-2 and cavity 107-3, that includes a bite adjustment structure 106 can be shaped to mate with three surfaces of a particular tooth. For an incisor or canine, the three surfaces can be a front (facial) surface 128, a back surface (lingual) surface 126, and a biting (incisal) surface 124. A bite adjustment structure 106-2 can be between a distal (toward the back of the jaw) surface of a first cavity 107 and a mesial (toward the front of the jaw) surface of an adjacent cavity 107.

In some embodiments, the second number of bite adjustment structures 106-2 can extend from a number of cavities of the second shell that receive incisors, canines, premolars, molars, and/or any combination thereof. The second number of bite adjustment structures can be designed to make contact with a corresponding tooth or a bite adjustment structure 106-1 on a corresponding tooth on an opposing jaw to provide a disocclusion between the first jaw and the second jaw.

As discussed above, the shape (e.g., size and/or contours, angle(s), etc.) and location (e.g., position on the cavity) of each of the second number of bite adjustment structures 106-2 can be based on one or more factors that indicate ineffective positioning. A particular bite adjustment structure 106-2 can have a shape and location specific to a particular stage of the treatment plan based, for example, on at least one of a contact between a particular first bite adjustment structure 106-1 and a particular second bite adjustment structure 106-2, a contact between particular first bite adjustment structure 106-1 and a particular tooth of an opposing jaw, a number of forces used to reposition a number of teeth of the first and second jaw, and an orientation of a tooth over which the bite adjustment structure 106-1 is positioned.

Also, as discussed above, the shape (e.g., size and/or contours, angle(s), etc.) and location (e.g., position on the cavity) of each of the second number of bite adjustment structures 106-2 can be specific to a stage of a treatment plan for which the appliance 102-2 was designed. For example, successive appliances created according to a treatment plan may have differently shaped and/or located second number of bite adjustment structures 106-2. The second number of bite adjustment structures 106-2 that have shapes and locations specific to particular stages of treatment can be advantageous over some previous approaches that use generic and/or uniform bite adjustment structures that are not specific to treatment stages and therefore may not accurately provide the desired correction for the treatment stage during which they are used. Such inaccurate treatment can lead to lengthening treatment plans, a need for a revised treatment plan, and/or unnecessary user discomfort, among other drawbacks. In contrast a number of embodiments of the present disclosure allow for more timely, accurate, and/or comfortable execution of treatment plans.

As discussed above, in some embodiments, an edge 101 of a cavity 107 opposite the biting (incisal) surface 124 of the cavity 107 can be shaped to extend beyond a gingival line 108 of the user. Extending portions of the shell over the gingival line 108 of the jaw can help to distribute a counterforce (e.g., counter to a number of forces applied to the bite adjustment structures 106-2) to other portions of the jaw.

Although not specifically illustrated, in some embodiments, a particular stage in a treatment plan can include bite adjustment structures on only one of a first appliance 106-1 and a second appliance 106-2. A particular stage in a treatment plan may not include any bite adjustment structures on either a first appliance 102-1 or a second appliance 102-2.

Further, a particular stage in a treatment plan can include bite adjustment structures 106 on cavities corresponding to incisors, canines, premolars, and/or molars, and/or any combination thereof. A particular stage in a treatment plan can include bite adjustment structures extending from a lingual surface of a cavity, a facial surface of a cavity 107, between a distal surface of a first cavity 107 and a mesial surface of an adjacent cavity 107, and/or combinations thereof.

Bite adjustment structures 106-1 on the first appliance 102-1 can be designed to make contact with one or more teeth 104-2 of the lower jaw and the bite adjustment structures 106-2 on the lower appliance 102-2 can be designed to make contact with one or more teeth 104-1 of the upper jaw. As used herein, a bite adjustment structure being "designed to make contact with teeth of an opposing jaw" can mean that the bite adjustment structure is designed to make contact with teeth of an opposing jaw that are or are not covered by another appliance.

A first appliance 102-1 can include a first number of bite adjustment structures 106-1 on a back (e.g., lingual) or front (e.g., facial) side of cavities 107 designed to receive upper canine teeth. The number of bite adjustment structures 106-1 can make contact with lower canine teeth and/or a corresponding bite adjustment structure 106-2 on a cavity of a second appliance 102-2 over the lower jaw and receive an inherent force therefrom when a user bites (e.g., so as to provide a disocclusion between posterior teeth of the user).

Additionally, a second appliance 102-2 can include a number of bite adjustment structures 106-2 on a back (e.g., lingual) or front (e.g., facial) side of cavities 107 designed to receive lower canine teeth. The number of bite adjustment structures 106-2 can make contact with upper canine teeth and/or a corresponding bite adjustment structure 106-1 on a cavity of a second appliance 102-2 over the upper jaw and receive an inherent force therefrom when a user bites (e.g., so as to provide a disocclusion between posterior teeth of the user).

In some embodiments, the appliances 102-1 and 102-2 can be designed to selectively distribute a counterforce (counter to an inherent force generated by the user's biting) to the posterior lower dentition. In some embodiments, a bite adjustment structure 106-1, 106-2 may be formed, for example, on a canine cavity of the upper jaw, a canine cavity of the lower jaw, between a distal surface of a lower canine cavity an a mesial surface of an adjacent first bicuspid cavity, and/or combinations thereof if traditional bite adjustment structures do not extend from the incisors a far enough distance to make contact with teeth 104-1, 104-2 and/or bite adjustment structures 106-1, 106-2 on the opposite jaw.

The bite adjustment structures 106-1, 106-2 can be designed to provide a disocclusion between opposing jaws. Providing a disocclusion between opposing jaws can allow for adjustment (e.g., correction) of a vertical relationship between the upper and lower jaws. That is, the bite adjustment structures 106-1, 106-2 can be designed and intended for adjustment of the vertical relationship between upper and lower jaws and/or a vertical relationship between respective teeth in the upper and lower jaws.

In some embodiments, the appliance 102-1, 102-2 can be designed to reposition a number of teeth 104-1, 104-2 over which the appliances 102-1, 102-2 is worn while the bite adjustment structures 106-1, 106-2 provide a disocclusion between opposing jaws. Providing a disocclusion between opposing jaws can help prevent appliances on opposing jaws from contacting (e.g., touching, allowing interaction of forces, etc.) each other (e.g., except at the bite adjustment structures 106-1, 106-2).

Providing a disocclusion between opposing jaws can adjust an occlusal plane (e.g., a global occlusal plane) of the user. Such an adjustment can be temporary (e.g., while the appliance 102-1, 102-2 is worn) and/or more permanent (e.g., by allowing for extrusion of teeth such as molars). For example, the bite adjustment structures 106-1, 106-2 can be designed to provide a disocclusion between opposing posterior teeth when the user bites (e.g., in some instances, a number of anterior teeth of the user may contact a bite adjustment structure 106-1, 106-2 on an appliance worn over an opposing jaw, which can prevent the user's posterior teeth from occluding). As used herein, "disocclusion" includes the provision of space between corresponding teeth of opposing jaws so that the teeth do not bind with and/or contact each other.

In some embodiments, the bite adjustment structures 106-1, 106-2 can be designed to adjust the jaw position. For example, bite adjustment structures 106-1, 106-2 on cavities of an appliance over a canine can be used to adjust the jaw position.

Adjusting the jaw position can help to prevent contact of posterior teeth of opposing jaws when the lower jaw slides sideways (e.g., contact between the upper and lower canines provides a disocclusion between the posterior teeth of opposing jaws when the lower jaw slides sideways with respect to the upper jaw in order to protect the posterior teeth). An appliance 102-1, 102-2 formed with bite adjustment structures 106-1, 106-2 on a canine cavity can adjust the jaw position by altering the contact between the canine cavity and a corresponding tooth on an opposing jaw to move one of the canine teeth to a predetermined position with respect to a canine tooth on the opposite jaw so that when the jaws move sideways with respect to one another the contact between the bite adjustment structure 106-1, 106-2 and the opposing tooth protects the posterior teeth by providing a disocclusion (e.g., where, without the bite adjustment structure 106-1, 106-2 the posterior teeth may contact and/or grind against each other as the jaws move sideways with respect to one another).

Modeling of Dental Appliances and Bite Adjustment Structures

Figure 2:
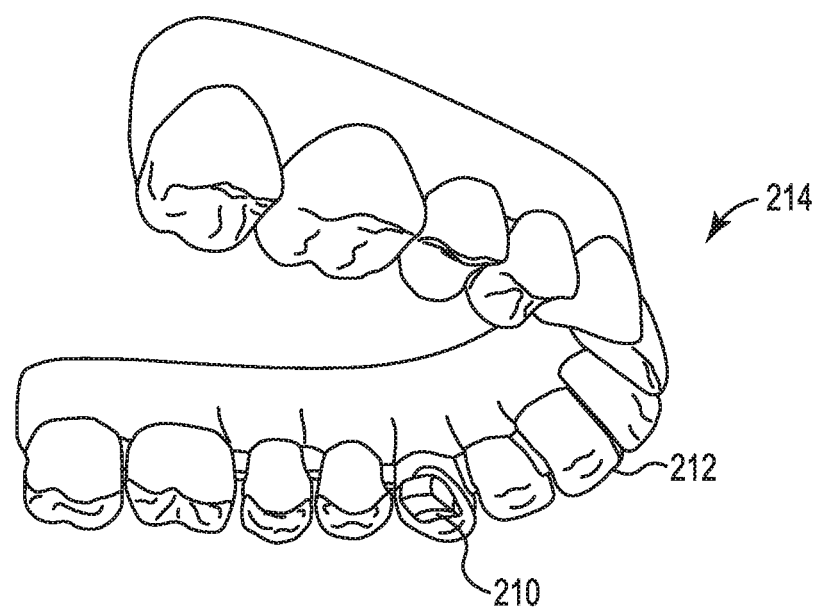
FIG. 2 illustrates a perspective view of a virtual model of a jaw according to a number of embodiments of the present disclosure.

FIG. 2 illustrates a perspective view of a virtual model 214 of a jaw according to a number of embodiments of the present disclosure. Embodiments of the present disclosure can include instructions that are executable by a processor (e.g., software), which can be fixed in a non-transitory computing device readable medium, to model a user's jaws (e.g., including teeth, roots, gingiva, and/or supporting structure, etc.). The instructions can be executed to create and/or modify a treatment plan to incrementally adjust the user's teeth and/or bite, among other adjustments, via application of a series of appliances as described herein. The instructions can be executed to provide modified models of the user's jaws for each of the various stages of the treatment plan for fabrication (e.g., via rapid prototyping such as stereolithography) of physical models corresponding to the virtual models 214. The physical models can be used for the fabrication (e.g., via thermoforming) of appliances thereover.

According to a number of embodiments of the present disclosure, the instructions can be executed to position a first number of virtual bite adjustment structures 210 on the back (lingual) surface of a corresponding number of virtual teeth 212 of a virtual model 214 of a first jaw. The instructions can be executed to determine whether the first number of virtual bite adjustment structures 210 positioned on the back (lingual) surface of the corresponding number of virtual teeth 212 of the virtual model 214 of the first jaw result in ineffective positioning or orientation between the corresponding number of virtual teeth 212 of the first jaw and a number of virtual teeth of a virtual model of a second jaw of the virtual model. Ineffective positioning or orientation can be the positioning or orientation between the corresponding number of virtual teeth 212 of the first jaw and a number of virtual teeth of a virtual model of a second jaw of the virtual that results in the misalignment of the patient's teeth. For example, ineffective positioning or orientation can result in a malocclusion (e.g., overjet, deepbite, crossbite, etc.).

The instructions can be executed wherein, if there is ineffective positioning or orientation, the instructions are executed to determine what one or more factors of a number of factors indicate the ineffective positioning. The instructions can be executed to adjust the position of the first number of virtual bite adjustment structures on the corresponding number of virtual teeth of the virtual model of the first jaw based on the one or more factors that indicate the ineffective positioning. For example, factors that indicate ineffective positioning include the incisors are crooked or tipped with respect to the teeth of the opposing jaw, the distance between the proposed position of the bite adjustment structure and the teeth of the opposing jaw is too great, among other factors. The instructions can be executed to provide the virtual model of the first jaw to a fabrication device for fabrication of a physical model corresponding to the first jaw for formation of a first appliance thereover such that the first appliance inherits a shape of the first number of virtual bite adjustment structures.

According to a number of embodiments of the present disclosure, the instructions can be executed to position a second number of virtual bite adjustment structures 210 on a corresponding number of virtual teeth 212 of a virtual model 214 of a second jaw. The instructions can be executed to determine whether the second number of virtual bite adjustment structures 210 positioned on the corresponding number of virtual teeth 212 of the virtual model 214 of the second jaw result in ineffective positioning or orientation between the corresponding number of virtual teeth 212 of the second jaw and a number of virtual teeth of a virtual model of a first jaw of the virtual model.

The instructions can be executed wherein, if there is ineffective positioning or orientation, determine what one or more factors of a number of factors that indicate the ineffective positioning. The instructions can be executed to adjust the position of the second number of virtual bite adjustment structures on the corresponding number of virtual teeth of the virtual model of the second jaw based on the one or more factors that indicate the ineffective positioning. The instructions can be executed to provide the virtual model of the second jaw to a fabrication device for fabrication of a physical model corresponding to the second jaw for formation of a second appliance thereover such that the second appliance inherits a shape of the second number of virtual bite adjustment structures.

According to a number of embodiments of the present disclosure, the instructions can be executed to position a number of virtual bite adjustment structures 210 on a corresponding number of virtual teeth 212 of a virtual model 214 of a jaw. The instructions can be executed to position the virtual bite adjustment structures 210 on the virtual teeth of the virtual model 214 of the jaw at a particular stage of treatment and/or adjust the position of the virtual bite adjustment structures 210 for subsequent stages of treatment. The virtual model 214 of the jaw can be different at each stage of treatment according to the treatment plan (e.g., positioning of the virtual teeth can change). The instructions can be executed to adjust the position of the virtual bite adjustment structures 210 according to changes to the virtual model 214 of the jaw between treatment stages and/or according to anticipated changes in subsequent stages of treatment (e.g., to help effectuate a desired change to the virtual model 214 of the jaw).

For each stage of treatment, the instructions can be executed to model forces applied to the virtual model 214 of the jaw by an appliance corresponding to that stage (to simulate actual forces to be applied to a user's physical jaw by a physical appliance). Those forces can include forces applied to the virtual model 214 of the jaw by virtue of the appliance being slightly out of alignment with a current configuration of the virtual teeth and/or include inherent forces applied to the aligner by the user (e.g., when the user bites on the bite adjustment structures). The instructions can be executed to adjust the shape of the virtual model 214 of the jaw such that a corresponding appliance formed thereover distributes a counterforce (counter to the inherent force applied by the user to the bite adjustment structures) to a number of posterior teeth of the physical jaw of the user.

Any of the number of virtual models illustrated and/or described herein (e.g., FIGS. 2, 3A-3D, 4, etc.) can represent a stage of a treatment plan, can be used to model forces applied to the virtual models, can be used to create a physical model for formation of a physical appliance thereover, can be used for direct fabrication of a physical appliance (without creating a physical model), among other uses.

Positioning and/or adjustment of positioning of virtual bite adjustment structures 210 on a virtual model 214 of a jaw can be automatic (e.g., by operation of software based on force modeling for a particular stage of treatment), manual (e.g., by operation of an operator interacting with the virtual model via an interface with a computing device), or a combination thereof. Likewise, the shape (e.g., size, orientation (e.g., various angles with respect to references)) and/or affixing location (on the virtual teeth) of the virtual bite adjustment structures 210 can be automatically set by the software, by manual operation (e.g., an operator can specify the necessary criteria of the virtual bite adjustment structures 210 and/or modify default criteria provided by the software), or a combination thereof.

As described herein, the bite adjustment structures can be used to provide a disocclusion and/or adjust the jaw position, among other uses. The instructions to position the virtual bite adjustment structures 210 can incorporate a result of instructions to model forces used to reposition virtual teeth 212. For example, the instructions can be executed to model a first number of forces used to reposition a corresponding number of virtual teeth 212 a first distance according to a first stage ("first" indicating an arbitrary stage, not necessarily an original stage) of a treatment plan and the instructions can be executed to incorporate a result of modeling the first number of forces in order to position the virtual bite adjustment structures 212. The instructions executed to adjust a position of the virtual bite adjustment structures 212 can incorporate a result of instructions executed to calculate a second number of forces used to reposition the number of virtual teeth 212 a second distance according to a second stage of the treatment plan (e.g., a stage subsequent to the first stage, not necessarily sequential thereto).

According to a number of embodiments of the present disclosure, physical bite adjustment structures do not need to be affixed to a user's physical teeth in order to fabricate appliances that include bite adjustment structures therein. With virtual modeling, an impression of the user's teeth (without physically affixing structures to the teeth) can be made and the virtual bite adjustment structures 210 can be added by software. Such embodiments can be beneficial in reducing chair time for users in a professional's office and/or reduce the use of materials associated with physically affixing structures to the teeth, which can reduce costs. Such embodiments can be beneficial in reducing user discomfort that may be associated with physically affixing structures to the teeth, even if the physically affixing structures to the teeth is temporary.

Figure 3A:
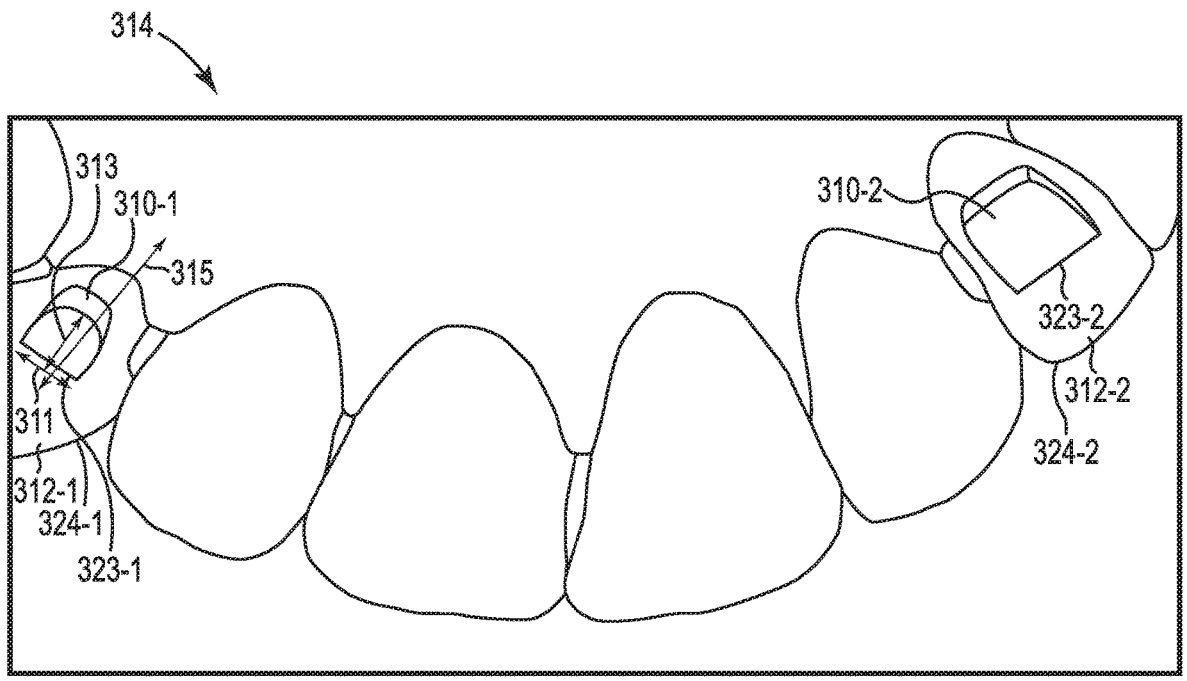
FIG. 3A illustrates a perspective view of a portion of a virtual model of a jaw corresponding to a first stage of treatment including a number of virtual bite adjustment structures positioned thereon according to a number of embodiments of the present disclosure.

FIG. 3A illustrates a perspective view of a portion of a virtual model 314 of a jaw corresponding to a first stage of treatment according to a number of embodiments of the present disclosure. The virtual model 314 includes a number of virtual teeth 312-1, 312-2 that each include a corresponding virtual bite adjustment structure 310-1, 310-2.

Figure 3B:
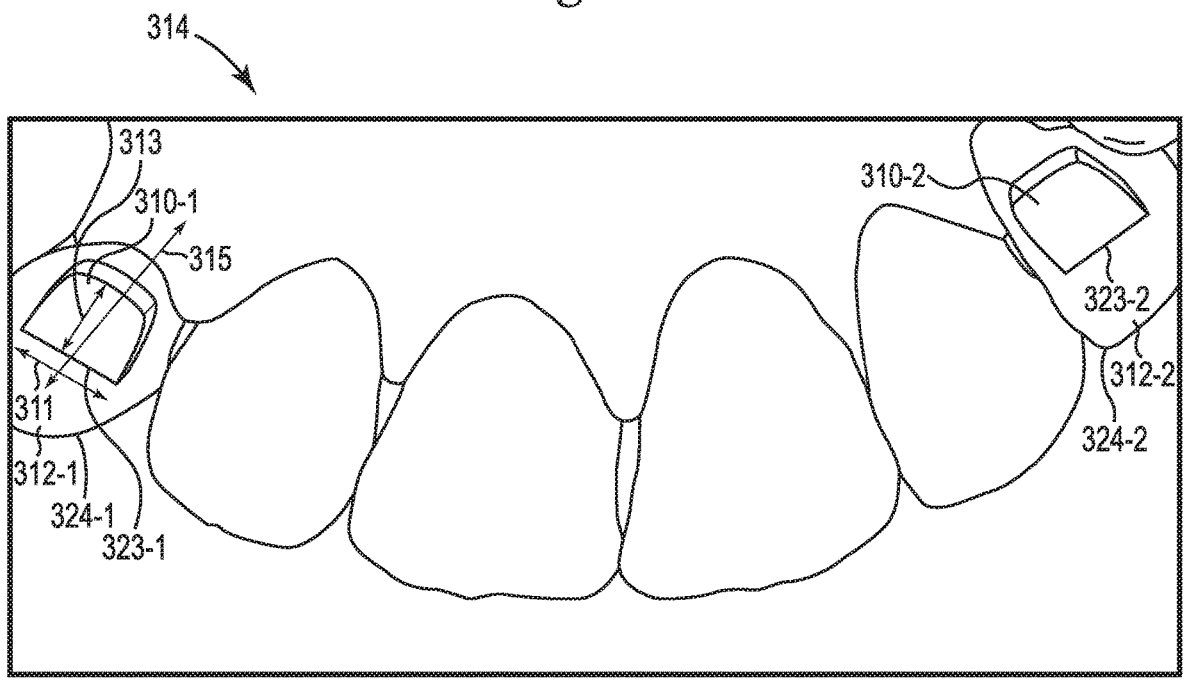
FIG. 3B illustrates a perspective view of a portion of a virtual model of a jaw corresponding to a second stage of treatment according to a number of embodiments of the present disclosure.
Figure 3C:
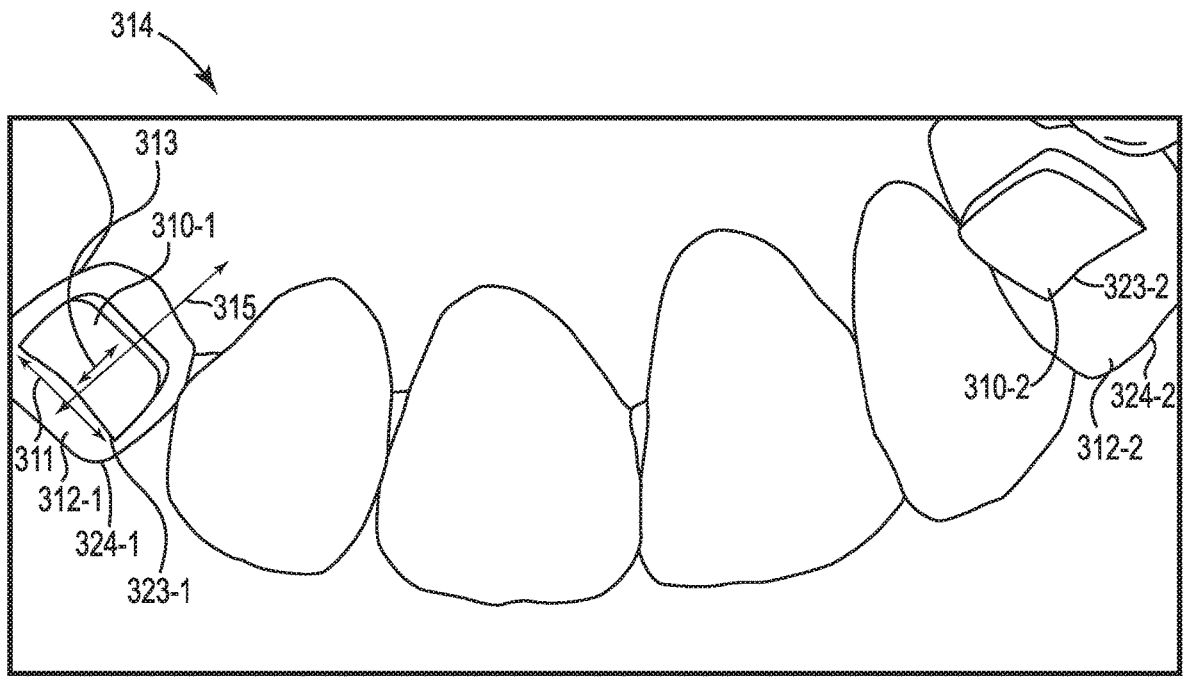
FIG. 3C illustrates a perspective view of a portion of a virtual model of a jaw corresponding to a third stage of treatment according to a number of embodiments of the present disclosure.
Figure 3D:
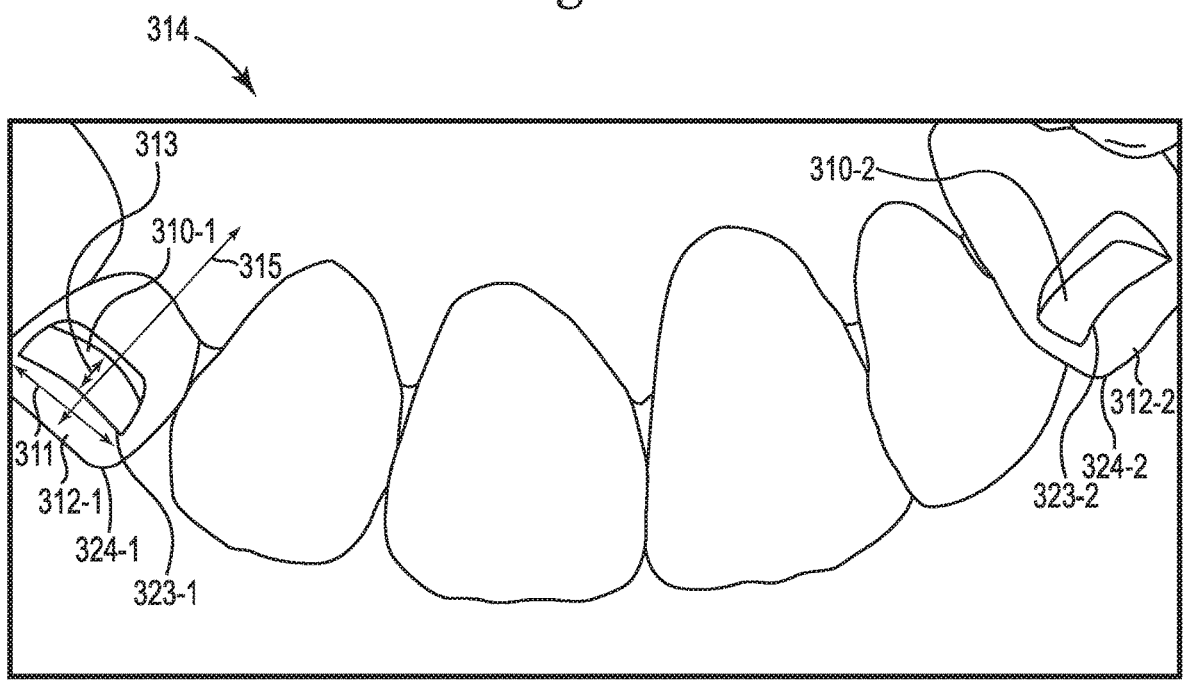
FIG. 3D illustrates a perspective view of a portion of a virtual model of a jaw corresponding to a fourth stage of treatment according to a number of embodiments of the present disclosure.

FIG. 3B illustrates a perspective view of a portion of a virtual model 314 of a jaw corresponding to a second stage of treatment according to a number of embodiments of the present disclosure. FIG. 3C illustrates a perspective view of a portion of a virtual model 314 of a jaw corresponding to a third stage of treatment according to a number of embodiments of the present disclosure. FIG. 3D illustrates a perspective view of a portion of a virtual model 314 of a jaw corresponding to a fourth stage of treatment according to a number of embodiments of the present disclosure.

As used herein, "first stage" does not necessarily mean the original stage of a treatment plan, but is a relative term with respect to other stages. For example, the "first stage" may be a second stage of a 50 stage treatment plan, while the "second stage" illustrated in FIG. 3B may be a tenth stage of the 50 stage treatment plan, while the "third stage" illustrated in FIG. 3C may be a 30th stage of the 50 stage treatment plan, and the "fourth stage" illustrated in FIG. 3D may be a 40th stage of the 50 stage treatment plan.

Embodiments can include more or fewer bite adjustment structures than are illustrated in FIGS. 3A-3D. For example, some treatment plans may include four bite adjustment structures for a first stage and two bite adjustment structures for a second stage. Each of the bite adjustment structures can have a shape and location specific to the respective stage of the treatment plan and based on at least one of a contact between a particular bite adjustment structure and a particular tooth, a first bite adjustment structure and a particular second bite adjustment structure, a number of forces used to reposition a number of teeth of a first and second jaw, and an orientation of a tooth over which the first bite adjustment structure is positioned.

FIG. 3A includes a first virtual tooth 312-1 with a first virtual bite adjustment structure 310-1 that is smaller than a second virtual bite adjustment structure 310-2 on a second virtual tooth 312-2. The first virtual bite adjustment structure 310-1 is smaller than the second virtual bite adjustment structure 310-2 in both a direction between adjacent teeth in the same jaw (mesial-distal direction) 311 and in a direction between the front of the mouth and the back of the mouth (facial-lingual direction) 313. In some embodiments, different bite adjustment structures can have different sizes in a direction between the root and the tip of a tooth (gingival-incisal/coronal direction) 315.

A bite adjustment structure can be designed with a different (e.g., smaller) size, for example, as corresponding teeth of opposing jaws get closer together during treatment. A bite adjustment structure can be designed with a different (e.g., larger) size, for example, as corresponding teeth of opposing jaws get farther apart during treatment. A bite adjustment structure can have a smaller or larger size in a direction between adjacent teeth in the same jaw (mesial-distal direction) 311 dependent upon proximity to one or more adjacent teeth (e.g., a bite adjustment structure can be designed to be smaller/larger to account for crowding/spacing so that the bite adjustment structure does not connect with neighboring teeth).

A bite adjustment structure can be designed to be in a different location on a tooth for different stages of treatment. As illustrated between FIG. 3B and FIG. 3C, an edge 323-1 of the virtual bite adjustment structure 310-1 that is closest to the biting (incisal) surface 324-1 moved closer to the biting (incisal) surface 324-1 of the virtual tooth 312-1. Furthermore, the virtual bite adjustment structure 310-1 increased in size in both a direction between adjacent teeth in the same jaw (mesial-distal direction) 311 and a direction between the root and the tip of a tooth (gingival-incisal/coronal direction) 315 between the second stage and the third stage.

Bite adjustment structures can be designed to change location on a tooth between treatment stages based on, for example, changes in intrusion or extrusion of the tooth (or a corresponding tooth on an opposing jaw) and/or movement of the tooth (or a corresponding tooth on an opposing jaw) (e.g., movement in a direction between adjacent teeth in the same jaw (mesial-distal direction) 312). For example, if a tooth is intruded during treatment, a bite adjustment structure for that tooth may be moved toward a biting (incisal) surface of the tooth in a subsequent stage of treatment to allow a corresponding tooth on the opposing jaw to continue to make contact with the bite adjustment structure. As used herein, "intrusion" includes forcing a tooth back into a jaw and/or preventing eruption of the tooth from the jaw.

Across FIGS. 3A-3D, the edges 323-1, 323-2 of the virtual bite adjustment structures 310-1, 310-2 closest to the biting (incisal) surfaces 324-1, 324-2 of the teeth generally change location toward the biting (incisal) surfaces 324-1, 324-2 of the virtual teeth 312-1, 312-2. Such a change in location can be designed for the virtual bite adjustment structures 310-1, 310-2, for example, as part of a treatment plan where the virtual teeth 312-1, 312-2 are being intruded into the jaw (as the teeth move up into the jaw, an occlusal plane defined by contact with the corresponding teeth on the opposing jaw would generally move in the direction between the root and the tip of a tooth (gingival-incisal/coronal direction) 315 toward the biting (incisal) surfaces 324-1, 324-2 of the virtual teeth 312-1, 312-2).

Figure 4:
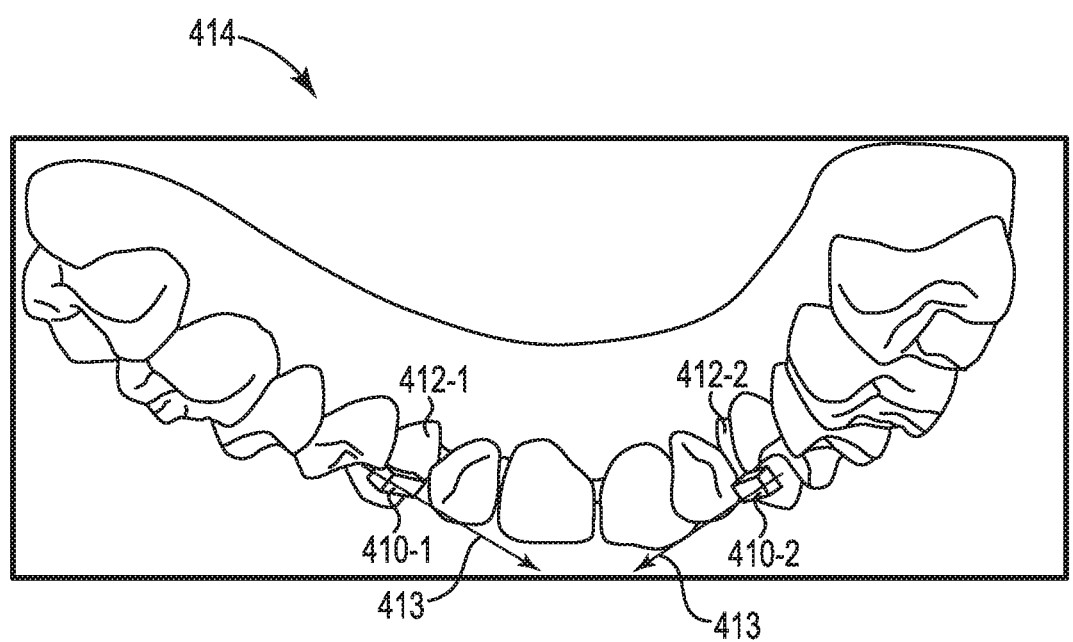
FIG. 4 illustrates a perspective view of a virtual model of a jaw according to a number of embodiments of the present disclosure.

FIG. 4 illustrates a perspective view of a virtual model 414 of a jaw according to a number of embodiments of the present disclosure. Appliances (e.g., formed based on virtual model 414) that include bite adjustment structures on canines can be used to provide a disocclusion between various opposing teeth in a user's jaws while the appliance is worn (e.g., to allow for eruption of teeth or other treatment goals).

The virtual bite adjustment structures 410-1 and 410-2 can extend from the virtual canines 412-1 and 412-2 in a direction from the outside of the mouth toward an inside of the mouth (facial-lingual) direction 413. Because the virtual bite adjustment structures 410-1 and 410-2 are extending from virtual canines 412-1 and 412-2, the virtual bite adjustment structures 410-1 and 410-2 are likely (depending on specific patient tooth geometry and alignment) to extend in a direction oblique to the occlusal plane. Although the angle of each virtual bite adjustment structure can be specific to the particular virtual tooth from which it extends, and patient tooth geometries and alignments will differ, virtual bite adjustment structures extending from virtual incisors may be closer to being parallel to the occlusal plane, virtual bite adjustment structures extending from virtual molars and/or premolars may be closer to being perpendicular to the occlusal plane, and virtual bite adjustment structures extending from virtual canines may be closer to being oblique to the occlusal plane.

According to a number of embodiments of the present disclosure, the virtual bite adjustment structures 410-1 and 410-2 can be positioned on a corresponding number of virtual teeth 412-1 and 412-2 of a virtual model 414 of a jaw at a particular stage of treatment. The position of the virtual bite adjustment structures 410-1 and 410-2 can be adjusted for subsequent stages of treatment (e.g., to help effectuate a desired change to the virtual model 414 of the jaw). For example, bite adjustment structures on cavities of an appliance over a canine can be used to adjust the jaw position.

As discussed above, adjusting the jaw position can help to prevent contact of posterior teeth of opposing jaws when the lower jaw slides sideways (e.g., contact between the upper and lower canines provides a disocclusion between the posterior teeth of opposing jaws when the lower jaw slides sideways with respect to the upper jaw in order to protect the posterior teeth). An appliance formed with bite adjustment structures on a canine cavity can adjust the jaw position by altering the contact between the canine cavity and a corresponding tooth on an opposing jaw so that when the jaws move sideways with respect to one another the contact between the bite adjustment structure and the opposing tooth protects the posterior teeth by providing a disocclusion (e.g., where, without the bite adjustment structure the posterior teeth may contact and/or grind against each other as the jaws move sideways with respect to one another).

Although not specifically illustrated, some embodiments can include a virtual bite adjustment structure on a number of teeth on one side of the jaw (e.g., either left or right) for a particular stage of treatment. Including a bite adjustment structure extending from a tooth on one side of the jaw can allow a number of teeth to erupt or passively extrude. In some embodiments, a first stage of treatment can include a number of bite adjustment structures extending from posterior teeth on the left side of a jaw and a second stage subsequent to the first stage can include a number of bite adjustment structures extending from teeth on the right side of the jaw (or vice versa). Varying the side of the jaw from which a virtual bite adjustment structure extends (from a tooth) can allow a number of teeth to be extruded from or erupt from both sides of the jaw alternately, among other benefits.

In some embodiments, a first stage of treatment can include a bite adjustment structure extending from a first tooth on one side (e.g., left or right) of a jaw and a second stage subsequent to the first stage can include a bite adjustment structure extending from a second (different) tooth on the same side of the jaw. Varying the tooth on the same side of the jaw from which a bite adjustment structure extends (from a posterior tooth) can allow a number of teeth to be extruded from or erupt from the same side of the jaw alternately, among other benefits.

Examples of Bite Adjustment Structures

Figure 5:
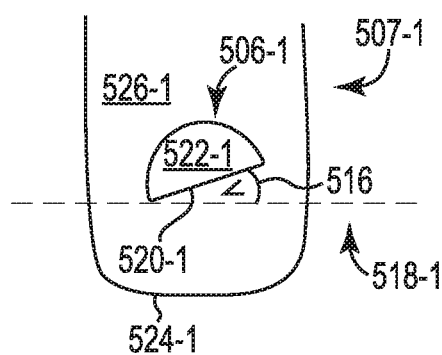
FIG. 5 illustrates a view of a portion of a dental position adjustment appliance according to a number of embodiments of the present disclosure.

FIG. 5 illustrates a view of a portion of a dental position adjustment according to a number of embodiments of the present disclosure. The portion of the dental position appliance includes a cavity 507-1 including a bite adjustment structure 506-1. For example, the bite adjustment structure 506-1 can be on a cavity over a canine tooth of the upper jaw. The cavity 507-1 can be shaped to mate with two surfaces of a tooth therein when worn by a user. Note that the left and right edges of the cavity 507-1 are shown for illustrative purposes, and may not physically be part of the appliance (e.g., the appliance may have an open channel between adjacent cavities contained therein so as not to interfere with an interproximal region between adjacent teeth of a user). As described herein, bite adjustment structures can include a shape and location that is designed to be specific to a particular stage of a treatment plan.

The bite adjustment structure 506-1 is illustrated on a back (lingual) surface 526-1 of the cavity 507-1. The cavity 507-1 (e.g., the bite adjustment structure 506-1 on the cavity 507-1) can have a first surface 520-1 extending away from a tooth within the cavity 507-1 in a front-to-back (toward the interior of the patient's mouth) direction (out of the page) proximal to a biting (incisal) surface 524-1 of the cavity 507-1. The cavity 507-1 (e.g., the bite adjustment structure 506-1) can have a second surface 522-1 that connects with the first surface 520-1 at a distance from the tooth within the cavity 507-1. The first surface 520-1 and the second surface 522-1 are both on a same side of the cavity 507-1 (e.g., the first surface 520-1 and the second surface 522-1 are both on the outside of the cavity 507-1 as opposed to the inside of the cavity 507-1 where a tooth is received). An angle 516 between the first surface 520-1 of the cavity 507-1 and an occlusal plane 518-1 of the user is illustrated.

According to a number of embodiments of the present disclosure, different cavities (not specifically illustrated in FIG. 5) can have different angles 516 between the first surface 520-1 and the occlusal plane 518-1. Having different angles between different bite adjustment structures 506-1 and the occlusal plane 518-1 can allow for more accurate modeling of forces applied to the bite adjustment structures 506-1 by opposing teeth of the user. Having different angles 516 between different bite adjustment structures 506-1 and the occlusal plane 518-1 can allow for more force to be applied to each of the bite adjustment structures 506-1 by opposing teeth of the user, for example, in a situation where a user has differently misaligned teeth in either an upper or lower jaw (e.g., where biting (incisal) surfaces 524-1 of different teeth approach the occlusal plane 518-1 with different angles). Modifying the angles 516 of individual bite adjustment structures 506-1 can allow first surfaces 520-1 (e.g., biting (incisal) surfaces) of individual bite adjustment structures 506-1 (e.g., each bite adjustment structure 506-1) to be substantially parallel to biting (incisal) surfaces of opposing teeth. In some embodiments, the bite adjustment structure 506-1 extends from a back (lingual) surface 526-1 of the cavity 507-1 of a upper canine tooth to make contact with a particular lower canine tooth to treat a positive canine overjet, where the overjet is less than or equal to 3 millimeters.

Figure 6A:
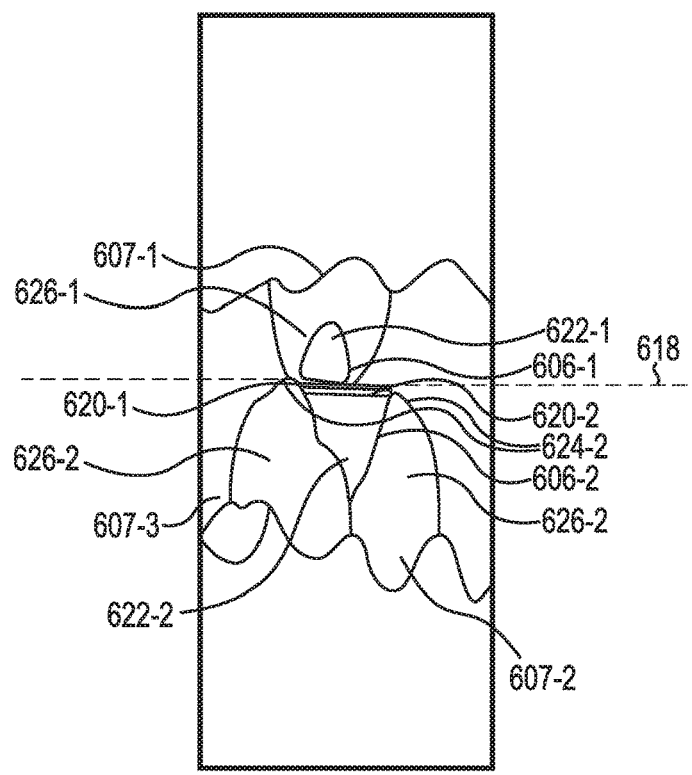
FIG. 6A illustrates a first view of a portion of a first dental position adjustment appliance and a second dental position adjustment appliance according to a number of embodiments of the present disclosure.
Figure 6B:
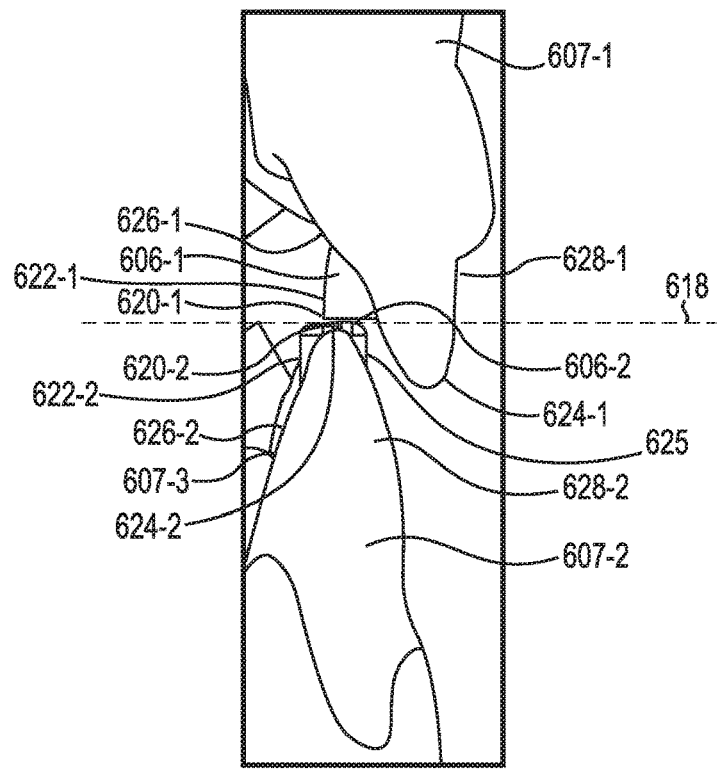
FIG. 6B illustrates second view of the portion of the first dental position adjustment appliance and the second dental position adjustment appliance illustrated in FIG. 6A according to a number of embodiments of the present disclosure.

FIGS. 6A and 6B illustrates a portion of a first appliance and a second appliance according to a number of embodiments of the present disclosure. The portion of the first appliance includes a cavity 607-1 including a bite adjustment structure 606-1. The cavity 607-1 can be shaped to mate with two surfaces of a tooth therein when worn by a user. Note that the left and right edges of the cavity 607-1 are shown for illustrative purposes, and may not physically be part of the appliance (e.g., the appliance may have an open channel between adjacent cavities contained therein so as not to interfere with an interproximal region between adjacent teeth of a user). As described herein, bite adjustment structures can include a shape and location that is designed to be specific to a particular stage of a treatment plan.

FIG. 6A illustrates the bite adjustment structure 606-1 is on a back (lingual) surface 626-1 of the cavity 607-1. The cavity 607-1 (e.g., the bite adjustment structure 606-1 on the cavity 607-1) can have a first surface 620-1 extending away from a tooth within the cavity 607-1 in a front-to-back (toward the interior of the patient's mouth) direction (out of the page) proximal to a biting (incisal) surface 624-1 of the cavity 607-1. The cavity 607-1 (e.g., the bite adjustment structure 606-1) can have a second surface 622-1 that connects with the first surface 620-1 at a distance from the tooth within the cavity 607-1. The first surface 620-1 and the second surface 622-1 are both on a same side of the cavity 607-1 (e.g., the first surface 620-1 and the second surface 622-1 are both on the outside of the cavity 607-1 as opposed to the inside of the cavity 607-1 where a tooth is received).

According to a number of embodiments of the present disclosure, different cavities (not specifically illustrated in FIGS. 6A and 6B) can have different angles between the first surface 620-1 and the occlusal plane 618. Having different angles between different bite adjustment structures 606-1 and the occlusal plane 618 can allow for more accurate modeling of forces applied to the bite adjustment structures 606-1 by opposing bite adjustment structure 606-2 on the cavity 607-2. Having different angles between different bite adjustment structures 606-1 and the occlusal plane 618 can allow for more force to be applied to each of the bite adjustment structures 606-1 by opposing bite adjustment structure 606-2, for example, in a situation where a user has differently misaligned teeth in either an upper or lower jaw (e.g., where biting (incisal) surfaces 624-1 and 624-2 of different teeth approach the occlusal plane 618 with different angles). Modifying the angles of individual bite adjustment structures 606-1 can allow first surfaces 620-1 (e.g., biting (incisal) surfaces) of individual bite adjustment structures 606-1 (e.g., each bite adjustment structure 606-1) to be substantially parallel to the surface 620-2 of the opposing bite adjustment structure 606-2.

The portion of the second appliance includes a first cavity 607-2 and a second cavity 607-3 including a bite adjustment structure 606-2. The first cavity 607-2 and the second cavity 607-3 can be shaped to mate with three surfaces of a tooth therein when worn by a user. The first cavity 607-2 and the second cavity 607-3 can be adjacent cavities in the same jaw. For example, the first cavity 607-2 can be a lower first bicuspid tooth and the second cavity 607-3 can be a lower canine tooth. As described herein, bite adjustment structures can include a shape and location that is designed to be specific to a particular stage of a treatment plan.

The bite adjustment structure 606-2 is illustrated between the distal (toward the back of the jaw) surface of the first cavity 607-2 and the mesial (toward the front of the jaw) surface of the second cavity 607-3 that is adjacent to the first cavity 607-2. The bite adjustment structure 606-2 can have a first surface 620-2 extending from the biting (incisal) surface 624-2 of a tooth within the cavity 607-2 to the biting (incisal) surface of a second tooth within the cavity 607-3 in a front-to-back (mesial-distal) direction. The bite adjustment structure 606-2 can have a second surface 622-2 that connects with the first surface 620-2 at a distance from between the distal surface of the first cavity 607-2 and the mesial surface of the second cavity 607-3 that is adjacent to the first cavity 607-2. The bite adjustment structure 606-2 can have a third surface 625, which is opposite the second surface 622-2, that connects with the first surface 620-2 at a distance from between the distal surface of the first cavity 607-2 and the mesial surface of the second cavity 607-3 that is adjacent to the first cavity 607-2. The first surface 620-2, the second surface 622-2, and the third surface 625 are all on a same side of the first cavity 607-2 and the second cavity 607-3 (e.g., the first surface 620-2, the second surface 622-2, and the third surface 625 are both on the outside of the first cavity 607-2 and the second cavity 607-3 as opposed to the inside of the first cavity 607-2 and the second cavity 607-3 where a first tooth and a second tooth is received). The bite adjustment structure 606-2 between the distal (toward the back of the jaw) surface of a first cavity 607-2 and the mesial (toward the front of the jaw) surface of the second cavity 607-3 can have minimal contact with the front (facial) and back (lingual) surfaces of the first cavity and the second cavity to ensure sufficient contact of aligners and/or crowns and to avoid conflicts with other bite adjustment structure placement.

As discussed above, different cavities (not specifically illustrated in FIG. 6) can have different angles between the first surface 620-2 and the occlusal plane 618. Having different angles between different bite adjustment structures 606-2 and the occlusal plane 618 can allow for more accurate modeling of forces applied to the bite adjustment structures 606-2 by an opposing bite adjustment structure 606-1. Having different angles between different bite adjustment structures 606-2 and the occlusal plane 618 can allow for more force to be applied to each of the bite adjustment structures 606-2 by the opposing bite adjustment structure 606-1, for example, in a situation where a user has differently misaligned teeth in either an upper or lower jaw (e.g., where biting (incisal) surfaces 624-2 of different teeth approach the occlusal plane 618 with different angles). Modifying the angles of individual bite adjustment structures 606-2 can allow first surfaces 620-2 (e.g., biting (incisal) surfaces) of individual bite adjustment structures 606-2 (e.g., each bite adjustment structure 606-2) to be substantially parallel to the surface of the opposing bite adjustment structure 606-1. The first surface 620-1 can be parallel to the occlusal plane 618.

In some embodiments, the bite adjustment structure 606-1 extends from a back (lingual) surface 626-1 of the cavity 607-1 of a upper canine tooth to make contact with a bite adjustment structure 606-2 extending between the distal (toward the back of the jaw) surface of a lower canine cavity 607-2 and the mesial (toward the front of the jaw) surface of a lower first bicuspid cavity 607-3 to treat a positive canine overjet.

Figure 7:
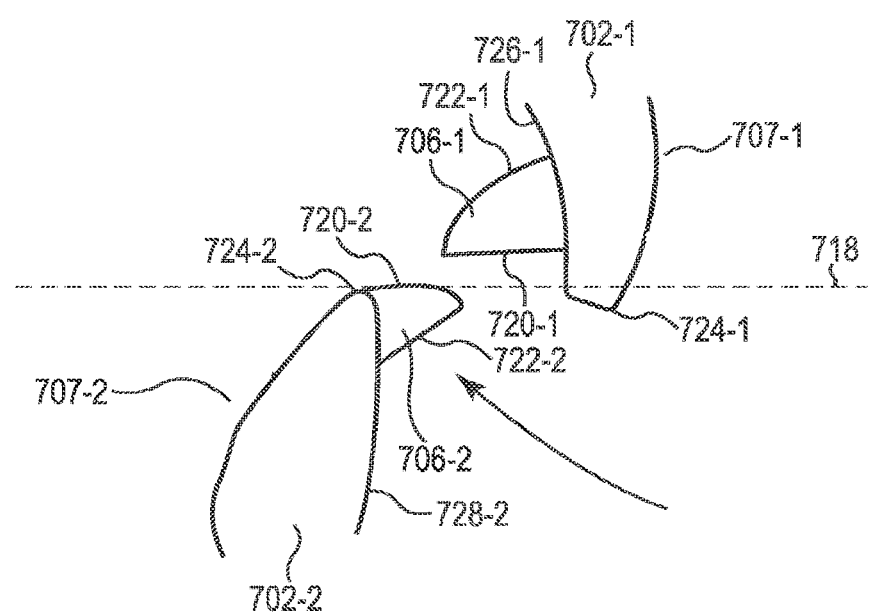
FIG. 7 illustrates a view of a portion of a first dental position adjustment appliance and a second dental position adjustment appliance according to a number of embodiments of the present disclosure.

FIG. 7 illustrates a view of a portion of a first appliance 702-1 and a second appliance 702-2 according to a number of embodiments of the present disclosure. The portion of the first dental position appliance 702-1 includes a cavity 707-1 including a bite adjustment structure 706-1. For example, the bite adjustment structure 706-1 can be on a cavity over a canine tooth of the upper jaw. The cavity 707-1 can be shaped to mate with two surfaces of a tooth therein when worn by a user. As described herein, bite adjustment structures can 706-1 include a shape and location that is designed to be specific to a particular stage of a treatment plan.

As discussed above, the bite adjustment structure 706-1 is illustrated on a back (lingual) surface 726-1 of the cavity 707-1. The cavity 707-1 (e.g., the bite adjustment structure 706-1 on the cavity 707-1) can have a first surface 720-1 extending away from a tooth within the cavity 707-1 in a front-to-back (toward the interior of the patient's mouth) direction proximal to a biting (incisal) surface 724-1 of the cavity 707-1. The cavity 707-1 (e.g., the bite adjustment structure 706-1) can have a second surface 722-1 that connects with the first surface 720-1 at a distance from the tooth within the cavity 707-1. The first surface 720-1 and the second surface 722-1 are both on a same side of the cavity 707-1 (e.g., the first surface 720-1 and the second surface 722-1 are both on the outside of the cavity 707-1 as opposed to the inside of the cavity 707-1 where a tooth is received).

Also, as discussed above, according to a number of embodiments of the present disclosure, different cavities (not specifically illustrated in FIG. 7) can have different angles between the first surface 720-1 and the occlusal plane 718. Having different angles between different bite adjustment structures 706-1 and the occlusal plane 718 can allow for more accurate modeling of forces applied to the bite adjustment structures 706-1 by an opposing bite adjustment structure 706-2. Having different angles between different bite adjustment structures 706-1 and the occlusal plane 718 can allow for more force to be applied to each of the bite adjustment structures 706-1 by opposing bite adjustment structure 706-2, for example, in a situation where a user has differently misaligned teeth in either an upper or lower jaw (e.g., where biting (incisal) surfaces 724-1 of different teeth approach the occlusal plane 718 with different angles). Modifying the angles of individual bite adjustment structures 706-1 can allow first surfaces 720-1 (e.g., biting (incisal) surfaces) of individual bite adjustment structures 706-1 (e.g., each bite adjustment structure 706-1) to be substantially parallel to the surface of the opposing bite adjustment structure 706-2.

The portion of the second dental position appliance includes a cavity 707-2 including a bite adjustment structure 706-2. For example, the bite adjustment structure 706-2 can be on a cavity over a canine tooth of the lower jaw. The cavity 707-2 can be shaped to mate with two surfaces of a tooth therein when worn by a user. As described herein, bite adjustment structures can include a shape and location that is deigned to be specific to a particular stage of a treatment plan.

The bite adjustment structure 706-2 is illustrated on a front (facial) surface 728-2 of the cavity 707-2. The cavity 707-2 (e.g., the bite adjustment structure 706-2 on the cavity 707-2) can have a first surface 720-2 extending away from the biting (incisal) surface 724-2 of a tooth within the cavity 707-2 in a front-to-back (facial-lingual) direction proximal to a biting (incisal) surface 724-2 of the cavity 707-2. The cavity 707-2 (e.g., the bite adjustment structure 706-2) can have a second surface 722-2 that connects with the first surface 720-2 at a distance from the tooth within the cavity 707-2. The first surface 720-2 and the second surface 722-2 are both on a same side of the cavity 707-2 (e.g., the first surface 720-2 and the second surface 722-2 are both on the outside of the cavity 707-2 as opposed to the inside of the cavity 707-2 where a tooth is received).

As discussed above, according to a number of embodiments of the present disclosure, different cavities (not specifically illustrated in FIG. 7) can have different angles between the first surface 720-2 and the occlusal plane 718. Having different angles between different bite adjustment structures 706-2 and the occlusal plane 718 can allow for more accurate modeling of forces applied to the bite adjustment structures 706-2 by an opposing bite adjustment structure 706-1. Having different angles between different bite adjustment structures 706-2 and the occlusal plane 718 can allow for more force to be applied to each of the bite adjustment structures 706-2 by the opposing bite adjustment structure 706-1, for example, in a situation where a user has differently misaligned teeth in either an upper or lower jaw (e.g., where biting (incisal) surfaces 724-2 of different teeth approach the occlusal plane 718 with different angles). Modifying the angles of individual bite adjustment structures 706-2 can allow first surfaces 720-2 (e.g., biting (incisal) surfaces) of individual bite adjustment structures 706-2 (e.g., each bite adjustment structure 706-2) to be substantially parallel to the surface of the opposing bite adjustment structure 706-1.

Figure 8:
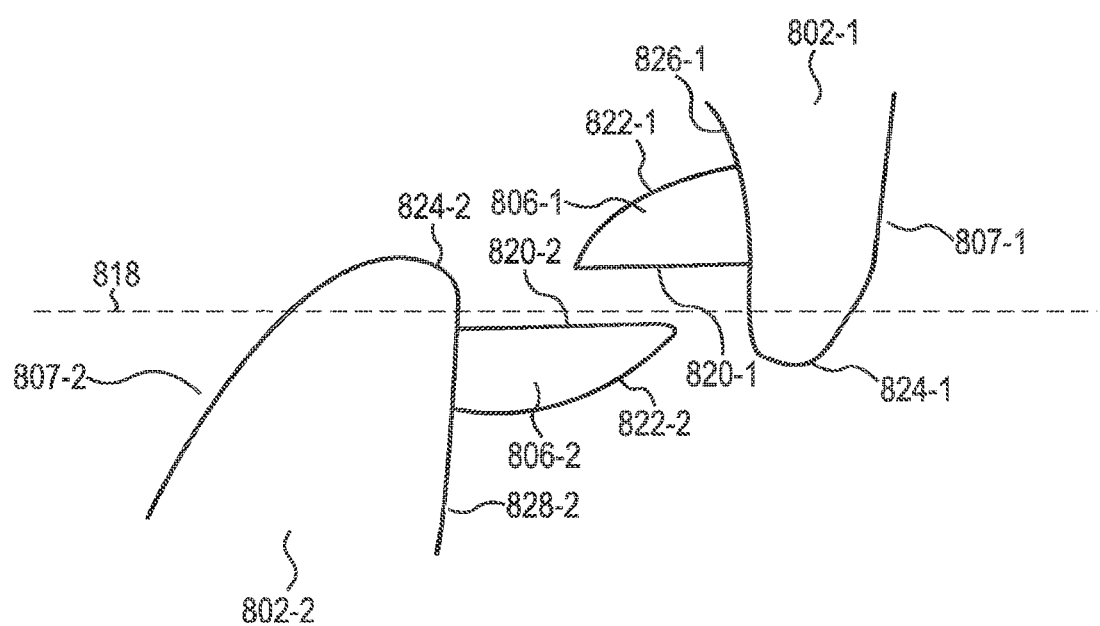
FIG. 8 illustrates a view of a portion of a first dental position adjustment appliance and a second dental position adjustment appliance according to a number of embodiments of the present disclosure.

FIG. 8 illustrates a view of a portion of a first appliance 807-1 and a second appliance 807-2 according to a number of embodiments of the present disclosure. The portion of the first dental position appliance 802-1 includes a cavity 807-1 including a bite adjustment structure 806-1. For example, the bite adjustment structure 806-1 can be on a cavity 807-1 over a canine tooth of the upper jaw. The cavity 807-1 can be shaped to mate with two surfaces of a tooth therein when worn by a user. As described herein, bite adjustment structures 806-1 can include a shape and location that is designed to be specific to a particular stage of a treatment plan.

As discussed above, the bite adjustment structure 806-1 is illustrated on a back (lingual) surface 826-1 of the cavity 807-1. The cavity 807-1 (e.g., the bite adjustment structure 806-1 on the cavity 807-1) can have a first surface 820-1 extending away from a tooth within the cavity 807-1 in a front-to-back (toward the interior of the patient's mouth) direction proximal to a biting (incisal) surface 824-1 of the cavity 807-1. The cavity 807-1 (e.g., the bite adjustment structure 806-1) can have a second surface 822-1 that connects with the first surface 820-1 a distance from the tooth within the cavity 807-1. The first surface 820-1 and the second surface 822-1 are both on a same side of the cavity 807-1 (e.g., the first surface 820-1 and the second surface 822-1 are both on the outside of the cavity 807-1 as opposed to the inside of the cavity 807-1 where a tooth is received).

Also, as discussed above, according to a number of embodiments of the present disclosure, different cavities (not specifically illustrated in FIG. 8) can have different angles between the first surface 820-1 and the occlusal plane 818. Having different angles between different bite adjustment structures 806-1 and the occlusal plane 818 can allow for more accurate modeling of forces applied to the bite adjustment structures 806-1 by an opposing bite adjustment structure 806-2. Having different angles between different bite adjustment structures 806-1 and the occlusal plane 818 can allow for more force to be applied to each of the bite adjustment structures 806-1 by opposing bite adjustment structure 806-2, for example, in a situation where a user has differently misaligned teeth in either an upper or lower jaw (e.g., where biting (incisal) surfaces 824-1 of different teeth approach the occlusal plane 818 with different angles). Modifying the angles of individual bite adjustment structures 806-1 can allow first surfaces 820-1 (e.g., biting (incisal) surfaces) of individual bite adjustment structures 806-1 (e.g., each bite adjustment structure 806-1) to be substantially parallel to the surface of an opposing bite adjustment structure 806-2.

The portion of the second dental position appliance 802-2 includes a cavity 807-2 including a bite adjustment structure 806-2. For example, the bite adjustment structure 806-2 can be on a cavity 807-2 over a canine tooth of the lower jaw. The cavity 807-2 can be shaped to mate with two surfaces of a tooth therein when worn by a user. As described herein, bite adjustment structures can include a shape and location that is designed to be specific to a particular stage of a treatment plan.

The bite adjustment structure 806-2 is illustrated on a front (facial) surface 828-2 of the cavity 807-2. The cavity 807-2 (e.g., the bite adjustment structure 806-2 on the cavity 807-2) can have a first surface 820-2 extending away from a tooth within the cavity 807-2 in a front-to-back (toward the exterior of the patient's mouth) direction proximal to a biting (incisal) surface 824-2 of the cavity 807-2. The cavity 807-2 (e.g., the bite adjustment structure 806-2) can have a second surface 822-2 that connects with the first surface 820-2 at a distance from the tooth within the cavity 807-2. The first surface 820-2 and the second surface 822-2 are both on a same side of the cavity 807-2 (e.g., the first surface 820-2 and the second surface 822-2 are both on the outside of the cavity 807-2 as opposed to the inside of the cavity 807-2 where a tooth is received).

As discussed above, according to a number of embodiments of the present disclosure, different cavities (not specifically illustrated in FIG. 8) can have different angles between the first surface 820-2 and the occlusal plane 818. Having different angles between different bite adjustment structures 806-2 and the occlusal plane 818 can allow for more accurate modeling of forces applied to the bite adjustment structures 806-2 by an opposing bite adjustment structure 806-1. Having different angles between different bite adjustment structures 806-2 and the occlusal plane 818 can allow for more force to be applied to each of the bite adjustment structures 806-2 by the opposing bite adjustment structure 806-1, for example, in a situation where a user has differently misaligned teeth in either an upper or lower jaw (e.g., where biting (incisal) surfaces 824-2 of different teeth approach the occlusal plane 818 with different angles). Modifying the angles of individual bite adjustment structures 806-2 can allow first surfaces 820-2 (e.g., biting (incisal) surfaces) of individual bite adjustment structures 806-2 (e.g., each bite adjustment structure 806-2) to be substantially parallel to the surface of the opposing bite adjustment structure 806-1.

Figure 9:
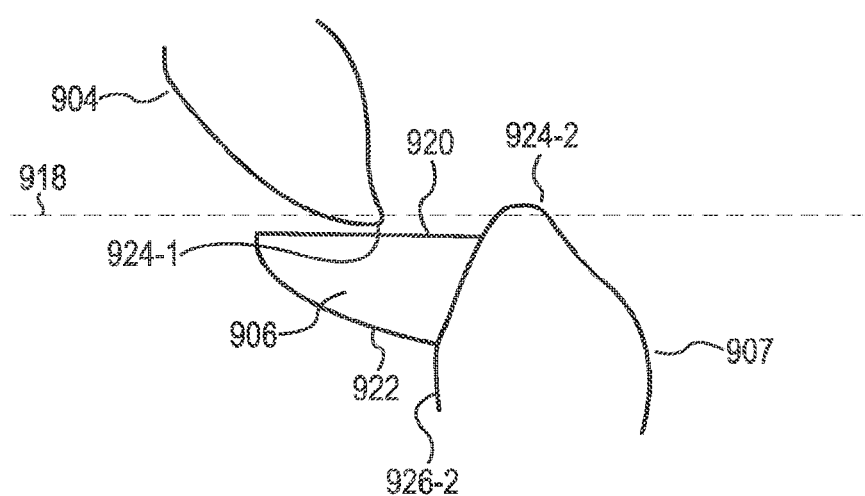
FIG. 9 illustrates a view of a portion of a dental position adjustment appliance according to a number of embodiments of the present disclosure.

FIG. 9 illustrates a view of a portion of a dental position adjustment appliance according to a number of embodiments of the present disclosure. The portion of the dental position appliance includes a cavity 907 including a bite adjustment structure 906. For example, the bite adjustment structure 906 can be on a cavity 907 over a canine tooth of the lower jaw. The cavity 907 can be shaped to mate with two surfaces of a tooth therein when worn by a user. As described herein, bite adjustment structures 906 can include a shape and location that is designed to be specific to a particular stage of a treatment plan.

As discussed above, the bite adjustment structure 906 is illustrated on a back (lingual) surface 926-2 of the cavity 907. The cavity 907 (e.g., the bite adjustment structure 906 on the cavity 907) can have a first surface 920 extending away from a tooth within the cavity 907 in a front-to-back (toward the interior of the patient's mouth) direction proximal to a biting (incisal) surface 924-2 of the cavity 907. The cavity 907 (e.g., the bite adjustment structure 906) can have a second surface 922 that connects with the first surface 920 at a distance from the tooth within the cavity 907. The first surface 920 and the second surface 922 are both on a same side of the cavity 907 (e.g., the first surface 920 and the second surface 922 are both on the outside of the cavity 907 as opposed to the inside of the cavity 907 where a tooth is received).

Also, as discussed above, according to a number of embodiments of the present disclosure, different cavities (not specifically illustrated in FIG. 9) can have different angles between the first surface 920 and an occlusal plane 918. Having different angles between different bite adjustment structures 906 and the occlusal plane 918 can allow for more accurate modeling of forces applied to the bite adjustment structures 906 by opposing teeth 904 of the user. Having different angles between different bite adjustment structures 906 and the occlusal plane 918 can allow for more force to be applied to each of the bite adjustment structures 906 by opposing teeth of the user, for example, in a situation where a user has differently misaligned teeth in either an upper or lower jaw (e.g., where biting (incisal) surfaces 924-1 and 924-2 of different teeth approach the occlusal plane 918 with different angles). Modifying the angles of individual bite adjustment structures 906 can allow first surfaces 920 (e.g., biting (incisal) surfaces) of individual bite adjustment structures 906 (e.g., each bite adjustment structure 906) to be substantially parallel to biting (incisal) surfaces 924-1 of opposing teeth 904 to treat a negative canine overjet.

Figure 10:
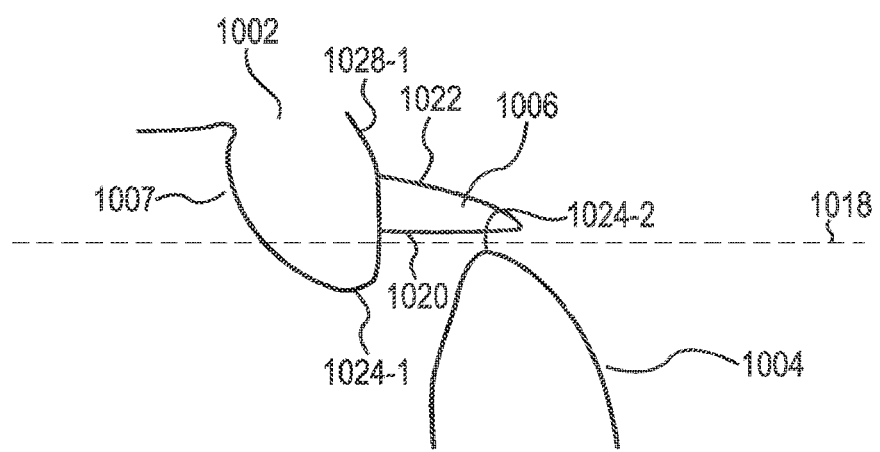
FIG. 10 illustrates a view of a portion of a dental position adjustment appliance according to a number of embodiments of the present disclosure.

FIG. 10 illustrates a view of a portion of a dental position adjustment appliance 1002 according to a number of embodiments of the present disclosure. The portion of the dental position appliance 1002 includes a cavity 1007 including a bite adjustment structure 1006. For example, the bite adjustment structure 1006 can be on a cavity 1007 over a canine tooth of the upper jaw. The cavity 1007 can be shaped to mate with two surfaces of a tooth therein when worn by a user. As described herein, bite adjustment structures 1006 can include a shape and location that is designed to be specific to a particular stage of a treatment plan.

As discussed above, the bite adjustment structure 1006 is illustrated on a front (facial) surface 1028-1 of the cavity 1007. The cavity 1007 (e.g., the bite adjustment structure 1006 on the cavity 1007) can have a first surface 1020 extending away from a tooth within the cavity 1007 in a front-to-back (toward the exterior of the patient's mouth) direction proximal to a biting (incisal) surface 1024-1 of the cavity 1007. The cavity 1007 (e.g., the bite adjustment structure 1006) can have a second surface 1022 that connects with the first surface 1020 at a distance from the tooth within the cavity 1007. The first surface 1020 and the second surface 1022 are both on a same side of the cavity 1007 (e.g., the first surface 1020 and the second surface 1022 are both on the outside of the cavity 1007 as opposed to the inside of the cavity 1007 where a tooth is received).

Also, as discussed above, according to a number of embodiments of the present disclosure, different cavities (not specifically illustrated in FIG. 10) can have different angles between the first surface 1020 and an occlusal plane 1018. Having different angles between different bite adjustment structures 1006 and the occlusal plane 1018 can allow for more accurate modeling of forces applied to the bite adjustment structures 1006 by opposing teeth 1004 of the user. Having different angles between different bite adjustment structures 1006 and the occlusal plane 1018 can allow for more force to be applied to each of the bite adjustment structures 1006 by opposing teeth of the user, for example, in a situation where a user has differently misaligned teeth in either an upper or lower jaw (e.g., where biting (incisal) surfaces 1024-1 and 1024-2 of different teeth approach the occlusal plane 1018 with different angles). Modifying the angles of individual bite adjustment structures 1006 can allow first surfaces 1020 (e.g., biting (incisal) surfaces) of individual bite adjustment structures 1006 (e.g., each bite adjustment structure 1006) to be substantially parallel to biting (incisal) surfaces of opposing teeth 1004.

Figure 11:
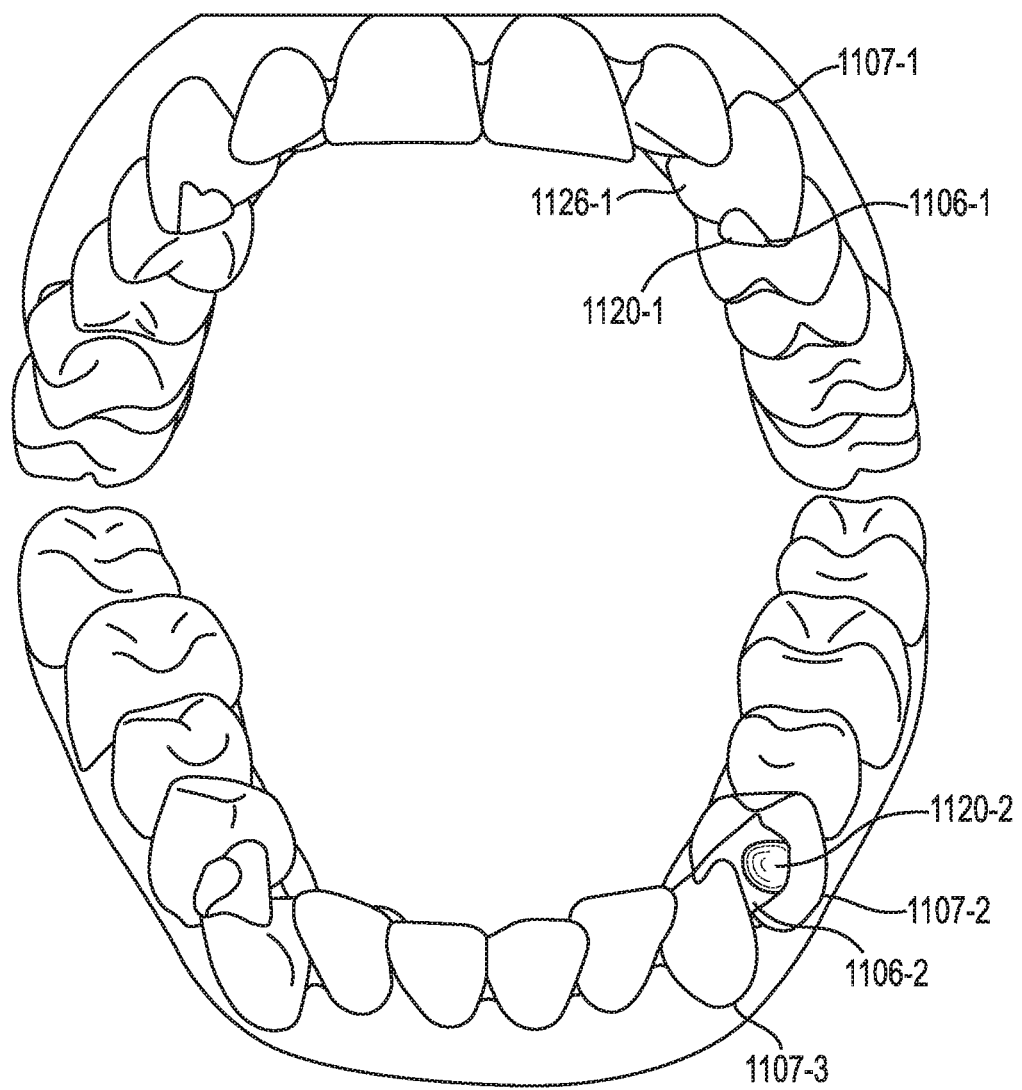
FIG. 11 illustrates a view of a portion of a first dental position adjustment appliance and a second dental position adjustment appliance according to a number of embodiments of the present disclosure.

FIG. 11 illustrates a view of a portion of a first dental position adjustment appliance and a second dental position adjustment appliance according to a number of embodiments of the present disclosure. The portion of the first appliance includes a cavity 1107-1 including a bite adjustment structure 1106-1. The cavity 1107-1 can be shaped to mate with two surfaces of a tooth therein when worn by a user. As described herein, bite adjustment structures can include a shape and location that is designed to be specific to a particular stage of a treatment plan.

FIG. 11 illustrates the bite adjustment structure 1106-1 is on a back (lingual) surface 1126-1 of the cavity 1107-1. The cavity 1107-1 (e.g., the bite adjustment structure 1106-1 on the cavity 1107-1) can have a first surface 1120-1. The first surface 1120-1 can be adapted to mate with a first surface of another bite adjustment structure. For instance, as illustrated in FIG. 11, the surface 1120-1 of the bite adjustment structure 1106-1 can be a convex shape that mates with a concave surface 1120-2 of the bite adjustment structure 1106-2.

The portion of the second appliance includes a first cavity 1107-2 and a second cavity 1107-3 including a bite adjustment structure 1106-2. The first cavity 1107-2 and the second cavity 1107-3 can be shaped to mate with three surfaces of a tooth therein when worn by a user. The first cavity 1107-2 and the second cavity 1107-3 can be adjacent cavities in the same jaw. For example, the first cavity 1107-2 can be a lower first bicuspid tooth and the second cavity 1107-3 can be a lower canine tooth. As described herein, bite adjustment structures can include a shape and location that is designed to be specific to a particular stage of a treatment plan.

The bite adjustment structure 1106-2 is illustrated between the distal (toward the back of the jaw) surface of the first cavity 1107-2 and the mesial (toward the front of the jaw) surface of the second cavity 1107-3 that is adjacent to the first cavity 1107-2. The bite adjustment structure 1106-2 can have a surface 1120-2. The first surface 1120-2 can be adapted to mate with a first surface of another bite adjustment structure. For instance, as illustrated in FIG. 11, the surface 1120-2 of the bite adjustment structure 1106-2 can be a concave shape that mates with a convex surface 1120-1 of the bite adjustment structure 1106-1.

Figure 12:
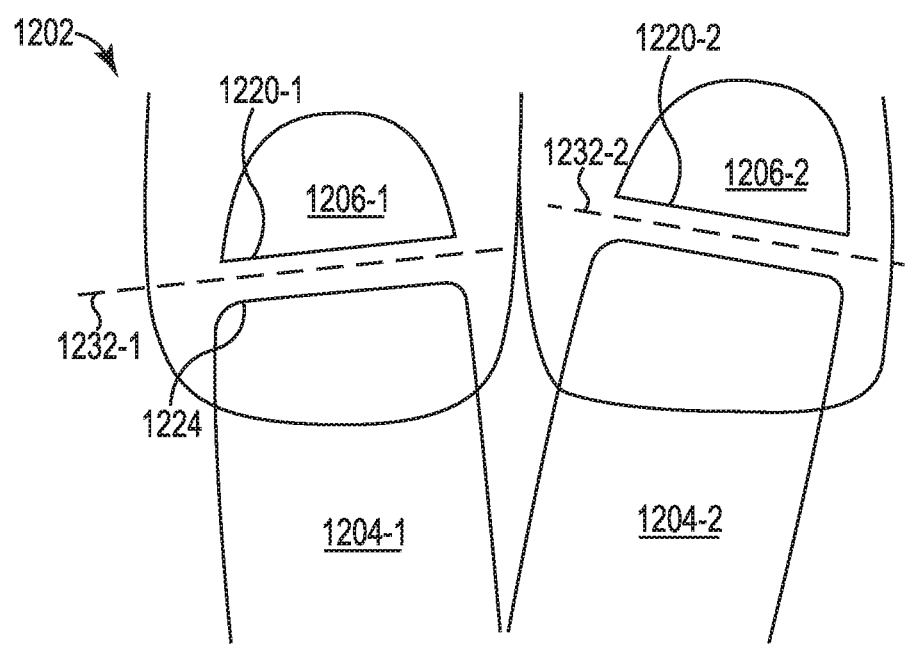
FIG. 12 illustrates a contact between a number of bite adjustment structures on a dental position adjustment appliance and a number of teeth on an opposing jaw according to a number of embodiments of the present disclosure.

FIG. 12 illustrates a contact between a number of bite adjustment structures 1206-1, 1206-2 on a dental position adjustment appliance 1202 and number of teeth 1204-1, 1204-2 on an opposing jaw according to a number of embodiments of the present disclosure. The number of teeth 1204-1, 1204-2 of the second jaw may or may not be covered by an appliance. The appliance may or may not include a number of bite adjustment structures. The number of bite adjustment structures 1206-1, 1206-2 can have a shape and location specific to a particular stage of a treatment plan that the appliance 1202 was designed to implement. Although only two cavities of the appliance 1202 are illustrated, other cavities may be included with the appliance 1202 and other cavities (some or all) can include bite adjustment structures thereon. A particular bite adjustment structure (e.g., bite adjustment structure 1206-1, or more than one bite adjustment structure) can have a shape and location specific to a particular stage of the treatment plan based on at least one of a contact between a particular first bite adjustment structure and a particular second bite adjustment structure, a particular bite adjustment structure and a particular tooth, a number of forces used to reposition a number of teeth of the first and second jaw, and an orientation of a tooth over which the first bite adjustment structure is positioned. The contact between the bite adjustment structure 1206-1 and the tooth 1204-1 can be defined by a relative geometry of the first surface 1220 of the bite adjustment structure 1206-1 and the biting (incisal) surface 1224 of the tooth 1204-1 and/or a biting (incisal) surface of a cavity of an appliance thereover. The first surface 1220-1 of the first cavity can be parallel to a local occlusal plane 1232-1 of a tooth 1204-1 opposite the first surface 1220-1 of the first cavity and the first surface 1220-2 of the second cavity can be parallel to a local occlusal plane 1232-2 of a tooth 1204-2 opposite the first surface 1220-2 of the second cavity. A local occlusal plane can be an occlusal plane between a particular upper tooth and a particular lower tooth that is based only on the occlusion of the particular upper tooth and particular lower tooth (e.g., as opposed to a global occlusal plane, which is based on the occlusion of teeth in the upper and lower jaws as a whole). The first surface 1220-1 of the bite adjustment structure 1206-1 and/or the first surface 1220-2 of the bite adjustment structure 1206-2 can be designed to provide a disocclusion between opposing posterior teeth when the user bites.

Although not specifically illustrated, in some embodiments, a bite adjustment structures can extrude from the surface of the cavity at an affixing location where the cavity makes contact with an opposing tooth to provide a disocclusion between opposing posterior teeth when the user bites. For example, a bite adjustment structure can extrude from the surface of a first canine tooth to make contact with an opposing canine tooth at a position where the opposing canines make contact without the use of a bite adjustment structure.

Although not specifically illustrated, the teeth 1204-1, 1204-2 can be covered by an appliance that can include bite adjustment structures to contact with biting (incisal) surfaces of the cavities of the appliance 1202. Various stages of a treatment plan can include or not include an appliance to cover the teeth 1204-1, 1204-2 of the opposing jaw and different stages of the treatment plan can include or not include a number of bite adjustment structures on the appliance for the opposing jaw. For example, a particular stage of a treatment plan can include an appliance over each of the upper jaw and lower jaw of a user, where each appliance includes a number of bite adjustment structures, and where the bite adjustment structures are designed to provide a disocclusion between opposing posterior teeth in order to level the teeth of the upper and lower jaws. Each appliance may also include a number of bite adjustment structures designed to adjust the jaw position so that when the upper and lower jaw move sideways with respect to one another the contact between the bite adjustment structure and the opposing tooth protects the posterior teeth by providing a disocclusion The positioning of the virtual bite adjustment structures on the virtual model can correspond to the actual position of the physical bite adjustment structures on the appliances that are fabricated by a fabrication device according to the virtual model. For example, as illustrated in FIG. 12, the bite adjustment structures 1206-1, 1206-2 (e.g., by operation of the user closing his jaws) may apply inherent forces 1234-1, 1234-2 to the teeth 1204-1, 1204-2 of the opposing jaw. As is also illustrated, the orientation of different teeth 1204-1, 1204-2 with respect to the orientation of different bite adjustment structures 1206-1, 1206-2 can be different based on the geometry of the contacts between the bite adjustment structures 1206-1, 1206-2 and the opposing teeth 1204-1, 1204-2 according to a particular stage the treatment plan. Thus, the bite adjustment structures 1206-1, 1206-2 can be specific to individual teeth 1204-1, 1204-2 as well as specific to the particular stage of the treatment plan. The bite adjustment structures 1206-1, 1206-2 may direct an inherent force (e.g., inherent from the user biting) perpendicular to the local occlusal plane 1232-1, 1232-2 where the bite adjustment structures 1206-1, 1206-2 contact opposing teeth 1204-1, 1204-2, an opposing appliance, and/or bite adjustment structures on an opposing appliance. In general there may not be lateral forces applied to the bite adjustment structures 1206-1, 1206-2 unless bite adjustment structures on an opposing appliance have been configured to apply such a force to the bite adjustment structures 1206-1, 1206-2.

Jaw Positioning

Figure 13A:
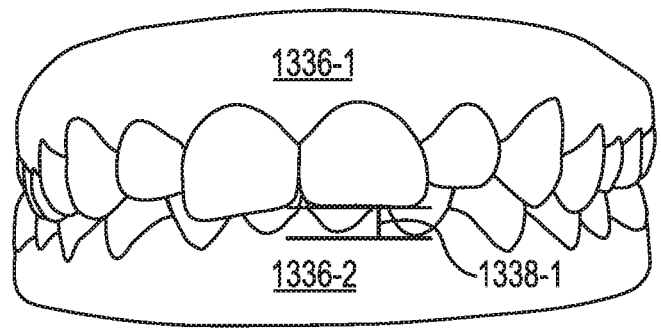
FIG. 13A illustrates the jaws of a patient in a first vertical relationship according to a number of embodiments of the present disclosure.
Figure 13B:
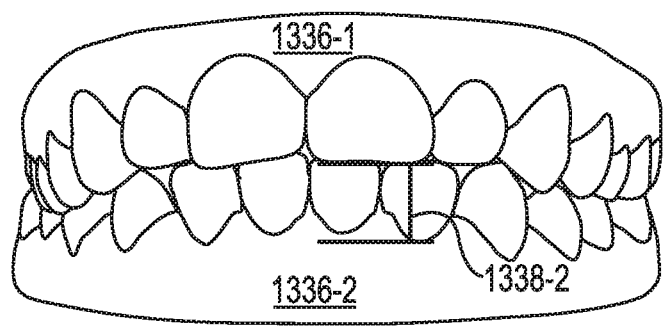
FIG. 13B illustrates the jaws of a patient in a second vertical relationship according to a number of embodiments of the present disclosure.

FIG. 13A illustrates jaws 1336-1, 1336-2 in a first vertical relationship 1238-1 according to a number of embodiments of the present disclosure. FIG. 13B illustrates jaws 1336-1, 1336-2 in a second vertical relationship 1338-2 according to a number of embodiments of the present disclosure. In some embodiments, an appliance (e.g., including a number of bite adjustment structures) worn over the upper jaw 1336-1 can be designed to adjust a vertical relationship 1338-1, 1338-2 between the upper jaw 1336-1 and the lower jaw 1336-2. As illustrated in FIG. 13A and FIG. 13B this adjustment of the vertical relationship 1338-1, 1338-2 can help correct for a deep bite to improve an appearance of the user's teeth and to reduce problems associated with a deep bite condition, as described herein. Embodiments are not limited to adjusting the position of the lower jaw 1336-2 with respect to the upper jaw 1336-1, as the position of either or both of the upper jaw 1336-1 and lower jaw 1336-2 can be adjusted. Furthermore, the adjustment can be performed by an appliance worn over the upper jaw 1336-1 and/or an appliance worn over the lower jaw 1336-2 (e.g., by contact of a number of bite tabs on a number of appliances with a number of teeth on an opposing jaw).

Figure 14:
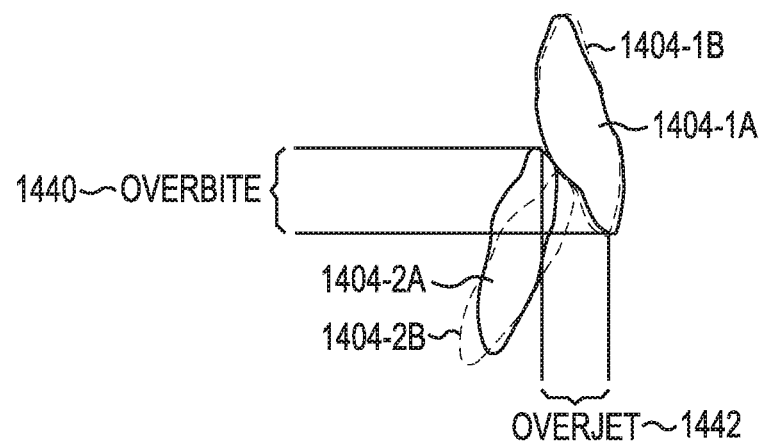
FIG. 14 illustrates a correction for overbite and overjet according to a number of embodiments of the present disclosure.

FIG. 14 illustrates a correction for overbite 1440 and overjet 1442 according to a number of embodiments of the present disclosure. Overbite 1440 can refer to the extent of vertical (superior-inferior) overlap of the maxillary central incisors 1404-1 over the mandibular central incisors 1404-2, measured relative to the incisal ridges. Overjet 1442 can be the distance between the maxillary anterior teeth 1404-1 and the mandibular anterior teeth 1404-2 in the anterior-posterior axis. As illustrated in FIG. 14, the maxillary tooth 1404-1 can be adjusted from a first position 1404-1A to a second position 1404-1B and/or the mandibular tooth 1404-2 can be adjusted from a first position 1404-2A to a second position 1404-2B.

A number of appliances in a series of appliances created as part of a treatment plan can perform different functions. Some of the functions performed by different appliances in the series may overlap and some may be unique to a particular appliance. By way of example, a first appliance can include a first number of bite adjustment structures designed to provide a disocclusion for a number of teeth of a first jaw and/or a second jaw to help correct for at least one of overjet 1442 and overbite 1440. A second appliance can include a second number of bite adjustment structures designed to provide a disocclusion for the number of teeth of the first jaw and/or the second jaw to correct for at least one of overjet 1442 and overbite 1440. In this example, the first appliance can correct for either or both of overjet 1442 and overbite 1440 and the second appliance can correct for either or both of overjet 1442 and overbite 1440. Correction for overbite and/or overjet can include adjustments to the position of various teeth and or relative positioning of the jaws by the appliances (e.g., including adjustments affected by the number of bite adjustment structures, as described herein). Such adjustments can include intrusion, rotation, inclination, and/or disocclusion, among others.

Computing System for Virtual Modeling

Figure 15:
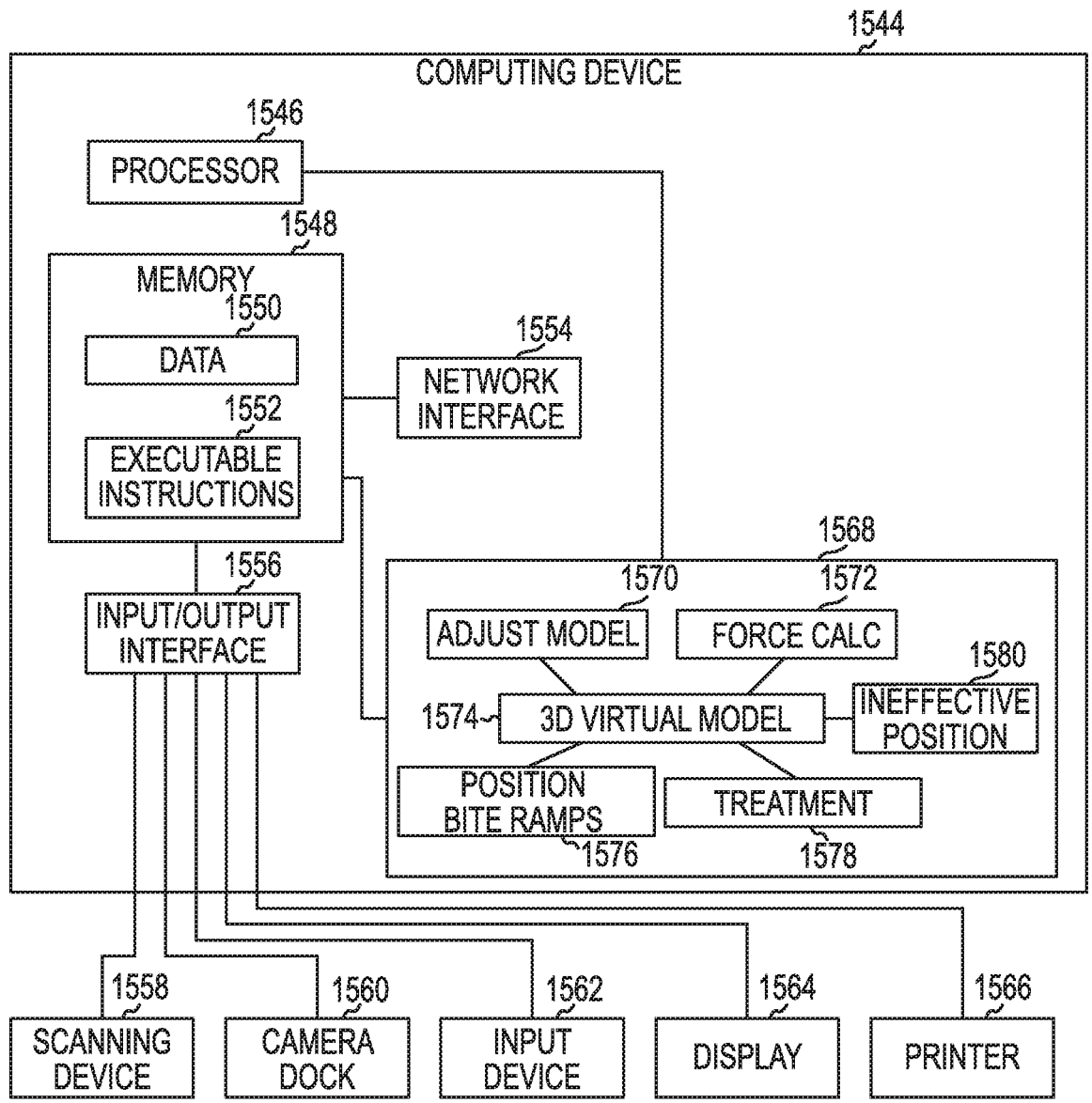
FIG. 15 illustrates a computing system for use in a number of embodiments of the present disclosure.

FIG. 15 illustrates a computing system for alternative specific bite adjustment structures according to one or more embodiments of the present disclosure. In the system illustrated in FIG. 15, the system includes a computing device 1544 having a number of components coupled thereto. The computing device 1544 includes a processor 1546 and memory 1548. The memory can include various types of information including data 1550 and executable instructions 1552 as discussed herein.

Memory and/or the processor may be located on the computing device 1544 or off the device in some embodiments. As such, as illustrated in the embodiment of FIG. 15, a system can include a network interface 1554. Such an interface can allow for processing on another networked computing device or such devices can be used to obtain information about the patient or executable instructions for use with various embodiments provided herein.

As illustrated in the embodiment of FIG. 15, a system can include one or more input and/or output interfaces 1556. Such interfaces can be used to connect the computing device with one or more input or output devices.

For example, in the embodiment illustrated in FIG. 15, the system includes connectivity to a scanning device 1558, a camera dock 1560, an input device 1562 (e.g., a keyboard, mouse, etc.), a display device 1564 (e.g., a monitor), and a printer 1566. The processor 1546 can be configured to provide a visual indication of a virtual model 1574 on the display 1564 (e.g., on a GUI running on the processor 1546 and visible on the display 1564). The input/output interface 1556 can receive data, storable in the data storage device (e.g., memory 1548), representing the virtual model 1574 (e.g., corresponding to the patient's upper jaw and the patient's lower jaw).

In some embodiments, the scanning device 1558 can be configured to scan a physical mold of a patient's upper jaw and a physical mold of a patient's lower jaw. In one or more embodiments, the scanning device 1558 can be configured to scan the patient's upper and/or lower jaws directly (e.g., intraorally).

The camera dock 1560 can receive an input from an imaging device (e.g., a 2D imaging device) such as a virtual camera or a printed photograph scanner. The input from the imaging device can be stored in the data storage device 1548.

Such connectivity can allow for the input and/or output of virtual model 1574 information or instructions (e.g., input via keyboard) among other types of information. Although some embodiments may be distributed among various computing devices within one or more networks, such systems as illustrated in FIG. 15 can be beneficial in allowing for the capture, calculation, and/or analysis of information discussed herein.

The processor 1546, in association with the data storage device 1548, can be associated with data and/or application modules 1568. The processor 1546, in association with the data storage device 1548, can store and/or utilize data and/or execute instructions to provide a number of application modules for alternative bite adjustment structures.

Such data can include the virtual model 1574 described herein (e.g., including a first jaw, a second jaw, a number of appliances, etc.). Such application modules can include an adjustment module 1570, a force calculation module 1572, a position bite adjustment structures module 1576, a treatment plan module 1578, and/or an ineffective positioning detection module 1580.

The position bite adjustment structures module 1576 can be configured to position a number of bite adjustment structures on a corresponding number of virtual teeth (e.g., canine teeth) of the virtual model 1574 of a jaw at a first stage of a treatment plan. The position module 1576 can be configured to incorporate a result of forces modeled by the force calculation module 1572 (e.g., forces used to reposition the corresponding number of virtual teeth a first distance according to a first stage of the treatment plan).

The ineffective positioning detection module 1580 can be configured to determine whether a determine whether a first number of virtual bite adjustment structures positioned on the lingual surface of a corresponding number of virtual teeth of a virtual model of a first jaw result in ineffective positioning or orientation between the corresponding number of virtual teeth of the first jaw and a number of virtual teeth of a virtual model of a second jaw of the virtual model. The ineffective position detection module 1580 can be configured to determine what one or more factors of a number of factors indicate the ineffective positioning if there is ineffective positioning or orientation. Ineffective positioning or orientation can be the positioning or orientation between the corresponding number of virtual teeth of the first jaw and a number of virtual teeth of a virtual model of a second jaw of the virtual that results in the misalignment of the patient's teeth. For example, ineffective positioning or orientation can result in a malocclusion (e.g., overjet, deepbite, crossbite, etc.).

The adjustment module 1570 can be configured to adjust the position of the number of virtual bite adjustment structures on the corresponding number of virtual teeth of the virtual model 1574 of the first jaw based on the one or more factors that indicate the ineffective positioning. As discussed above, factors that indicate ineffective positioning include the incisors are crooked or tipped with respect to the teeth of the opposing jaw, the distance between the proposed position of the bite adjustment structure and the teeth of the opposing jaw is too great, among other factors. The adjustment module 1570 can be configured to adjust the position of the number of virtual bite adjustment structures on the corresponding number of virtual teeth of the virtual model 1574 of the jaw at a second stage of the treatment plan according to changes to the virtual model 1574 of the jaw between the first stage and the second stage of the treatment plan. The adjustment module 1570 can be configured to adjust the position of the number of virtual bite adjustment structures by changing a shape (e.g., size, a number of angles, etc.) and/or an affixing location of the number of virtual bite adjustment structures on the corresponding number of virtual teeth of the virtual model of the jaw. The adjustment module 1570 can be configured to adjust a shape of the virtual model 1574 of the jaw at the first stage of the treatment plan such that the corresponding one of the appliances formed thereover distributes a counterforce corresponding to the force modeled by the force calculation module 1572 to a number of posterior teeth of the user's jaw. The adjustment module 1570 can be configured to incorporate a result of forces modeled by the force calculation module 1572 (e.g., forces used to reposition the corresponding number of virtual teeth a second distance according to a second stage of the treatment plan).

The force calculation module 1572 can be configured to model an inherent force applied to the number of bite adjustment structures by a user wearing a corresponding one of the appliances during the first stage of the treatment plan. The treatment plan module 1578 can be configured to create, edit, delete, revise, or otherwise modify the treatment plan (e.g., based at least in part on operation of other application modules 1568).

The virtual model 1574 can be provided (e.g., via network interface 1554) to a fabrication device for fabrication of a physical model corresponding to the jaw for formation of an appliance thereover such that the appliance inherits a shape of the number of virtual bite adjustment structures. The virtual model 1574 can be provided (e.g., via network interface 1554) to a fabrication device for fabrication of physical models corresponding to the jaw at the first and the second stages of the treatment plan for formation of appliances thereover such that the appliances inherit a shape of the number of virtual bite adjustment structures.

Method of Forming a Dental Appliance Including a Bite Adjustment Structure

Figure 16:
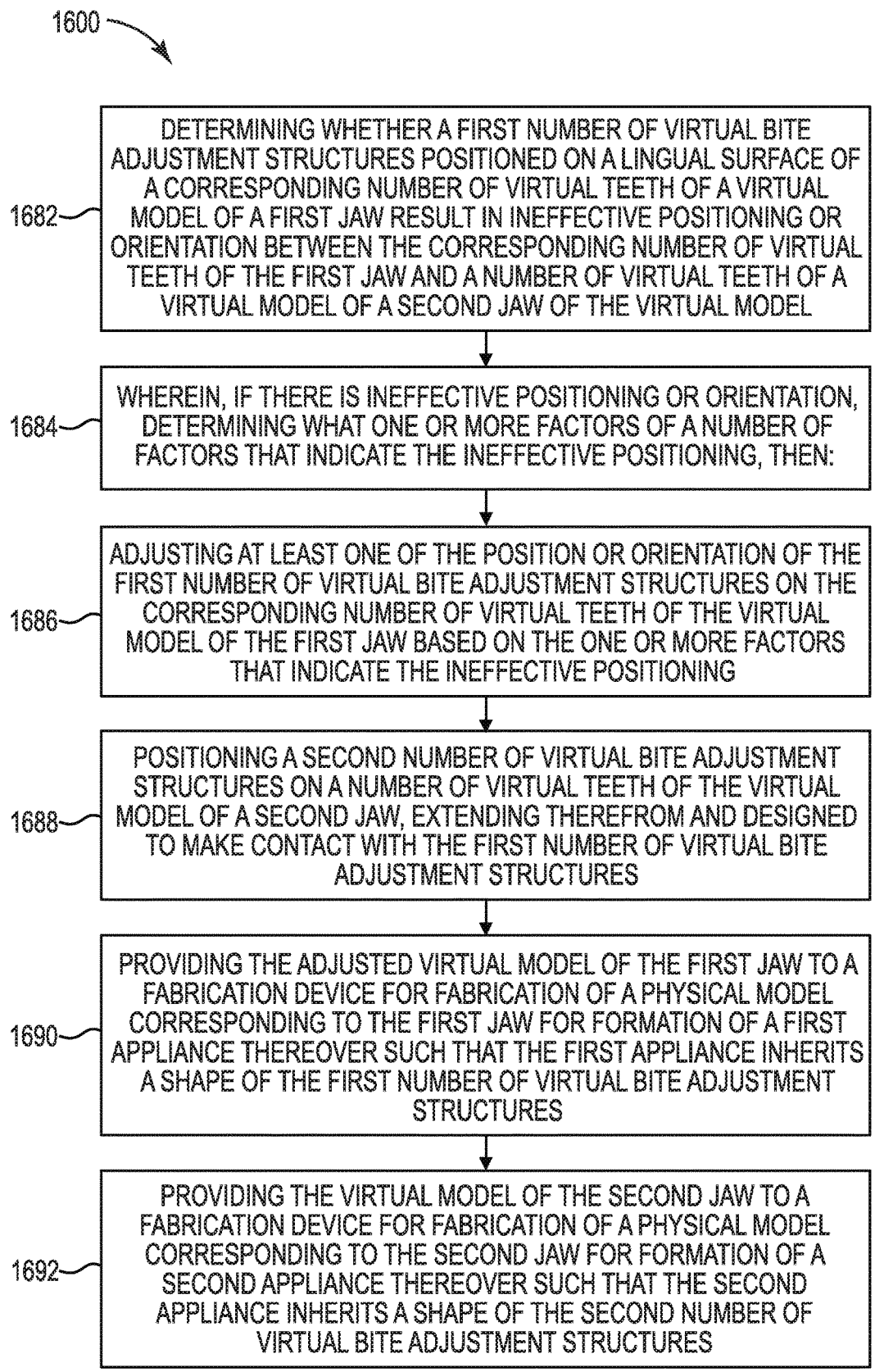
FIG. 16 illustrates a method of forming a dental appliance according to some implementations.

FIG. 16 illustrates a flowchart of a method 1600 of forming a dental appliance according to some implementations. The method 1600 may include more or less operations than those explicitly shown in FIG. 16. Some or all operations of the method may be executed by the computing system illustrated in FIG. 15 and/or other structures shown in FIG. 15. The method 1600 may be used to form a dental appliance including a bite adjustment structure. At an operation 1682, a first number of virtual bite adjustment structures positioned on a lingual surface of a corresponding number of virtual teeth of a virtual model of a first jaw may be determined to result in ineffective positioning or orientation between the corresponding number of virtual teeth of the first jaw and a number of virtual teeth of a virtual model of a second jaw of the virtual model.

At an operation 1684, if there is ineffective positioning or orientation, what one or more factors of a number of factors may be determined that indicate the ineffective positioning. At operation 1686, the position of the first number of virtual bite adjustment structures may be adjusted on the corresponding number of virtual teeth of the virtual model of the first jaw based on the one or more factors that indicate the ineffective positioning. At an operation 1688, a second number of virtual bite adjustment structures may be positioned on a number of virtual teeth of the virtual model of a second jaw, extending therefrom and designed to make contact with the first number of virtual bite adjustment structures.

At an operation 1690 the virtual model of the first jaw may be provided to a fabrication device for fabrication of a physical model corresponding to the first jaw for formation of a first appliance thereover such that the first appliance inherits a shape of the first number of virtual bite adjustment structures. At an operation 1692, the virtual model of the second jaw may be provided to a fabrication device for fabrication of a physical model corresponding to the second jaw for formation of a second appliance thereover such that the second appliance inherits a shape of the second number of virtual bite adjustment structures. The shape of the first number of virtual bite adjustment structures and the shape of the second number of virtual bite adjustment structures may provide the same interference on the left side and the right side of the first and second jaw resulting in disocclusion between the first jaw and the second jaw. Alternatively, the shape of the first number of virtual bite adjustment structures and the shape of the second number of virtual bite adjustment structures provide different interference on the left side and the right side of the first and second jaw to adjust jaw positioning.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 606 in FIG. 6.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description. It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A dental appliance system, comprising:
a first aligner of a series of aligners configured to incrementally implement a treatment plan, comprising a first shell having a plurality of cavities each configured to receive at least one tooth of an upper jaw, the first shell having a first bite adjustment structure formed as part of the first shell, the first bite adjustment structure extending from a lingual surface of at least one of the plurality of cavities of the first aligner, wherein the first bite adjustment structure has a first shape and location specific to a first stage of the treatment plan; and
a second aligner of the series of aligners, the second aligner comprising a second shell having a plurality of cavities each configured to receive at least one tooth of a lower jaw, the plurality of cavities of the second shell including a first cavity adjacent to a second cavity, the second shell having a second bite adjustment structure formed as part of the second shell, wherein at least a portion of the second bite adjustment structure is positioned between a distal surface of the first cavity and a mesial surface of the second cavity and is designed to make contact with the first bite adjustment structure,
wherein, when the first and second aligners are worn on respective upper and lower jaws, a first bite surface of the first bite adjustment structure is arranged to be at a different angle with respect to an occlusal plane of the at least one tooth of the upper jaw and the at least one tooth of the lower jaw, and the first bite surface is arranged to be parallel to a second bite surface of the second bite adjustment structure.

2. The system of claim 1, wherein the first shape and location are determined based on at least one of: a contact between a particular first bite adjustment structure and a particular second bite adjustment structure, a number of forces used to reposition a number of teeth of the upper and low jaws, and an orientation of a tooth over which the particular first bite adjustment structure is positioned.

3. The system of claim 1, wherein a second shape and location of the second bite adjustment structure is determined based on at least one of: a contact between the first bite adjustment structure and the second bite adjustment structure, a number of forces used to reposition a number of teeth of the upper and low jaws, and an orientation of a tooth over which the first bite adjustment structure is positioned.

4. The system of claim 1, further comprising:
a third aligner of the series of aligners designed to incrementally implement the treatment plan, comprising a third shell having a plurality of cavities therein designed to receive teeth of the upper jaw, the third shell having a third bite adjustment structure formed as part of the third shell, the third bite adjustment structure extending from a lingual surface of at least one of the plurality of cavities of the third aligner, wherein the third bite adjustment structure has a third shape and location specific to a second stage of the treatment plan, wherein the third shape and location of the third bite adjustment structure is different than the first shape and location of the first bite adjustment structure; and
a fourth aligner of the series of aligners, the fourth aligner comprising a fourth shell having a plurality of cavities therein designed to receive teeth of the lower jaw, the plurality of cavities of the fourth shell including a third cavity adjacent to a fourth cavity, the fourth shell having a fourth bite adjustment structure formed as part of the fourth shell.

5. The system of claim 1, wherein the first bite adjustment structure extends from a cavity of the first shell that receives a canine tooth.

6. The system of claim 1, wherein the first bite adjustment structure extends from a cavity of the first shell that receives a canine tooth, and wherein the first bite adjustment structure is designed to make contact with the second bite adjustment structure at a location that is laterally between the distal surface of the first cavity and the mesial surface of the second cavity of the second aligner.

7. The system of claim 1, wherein the cavities of the first aligner are configured to apply repositioning forces to the at least one tooth of the upper jaw according to a stage of the treatment plan, and the cavities of the second aligner are configured to apply repositioning forces to the at least one tooth of the lower jaw according to the stage of the treatment plan.

8. The system of claim 1, wherein the at least one of the plurality of cavities of the first aligner is configured to receive a canine tooth of the upper jaw, and the at least one of the plurality of cavities of the second aligner is configured to receive a canine tooth of the lower jaw.

9. A dental appliance system, comprising:
a first aligner having a plurality of cavities configured to receive teeth of a first jaw of a patient, the first aligner including a first bite adjustment structure formed as part of the first aligner, the first bite adjustment structure extending from at least one of the plurality of cavities and having a first shape and location specific to a first stage of a treatment plan; and
a second aligner having a plurality of cavities configured to receive teeth of a second jaw of the patient, the plurality of cavities of the second aligner including a first cavity adjacent to a second cavity, the second aligner having a second bite adjustment structure that is at least partially positioned between a distal surface of the first cavity and a mesial surface of the second cavity, wherein the second bite adjustment structure of the second aligner is arranged to make contact with the first bite adjustment structure of the first aligner,
wherein, when the first and second aligners are worn on respective first and second jaws, a first bite surface of the first bite adjustment structure is arranged to be at a different angle with respect to an occlusal plane of the teeth of the first jaw and the teeth of the second jaw, and the first bite surface is arranged to be parallel to a second bite surface of the second bite adjustment structure.

10. The system of claim 9, wherein the one or more bite adjustment structures of the first aligner are on one or more cavities of the first aligner that are configured to receive one or more canine teeth of the first jaw.

11. The system of claim 9, wherein the first jaw is a lower jaw, and the second jaw is an upper jaw.

* * * * *